United States Patent [19]

Minagawa et al.

[11] 4,396,735
[45] Aug. 2, 1983

[54] SYNERGISTIC LIGHT STABILIZER COMPOSITIONS FOR SYNTHETIC RESINS AND RESIN COMPOSITIONS CONTAINING THE SAME

[75] Inventors: Motonobu Minagawa, Kosigaya; Naohiro Kubota; Toshihiro Shibata, both of Urawa, all of Japan

[73] Assignee: Adeka Argus Chemical Co., Ltd., Urawa, Japan

[21] Appl. No.: 193,551

[22] Filed: Oct. 3, 1980

Related U.S. Application Data

[63] Continuation of Ser. No. 954,815, Oct. 26, 1978, abandoned.

[30] Foreign Application Priority Data

Nov. 21, 1977 [JP] Japan ............................. 52-140187

[51] Int. Cl.³ .................... C08K 5/34; C09K 15/18
[52] U.S. Cl. ............................. 524/92; 252/400 A; 252/400 R; 252/401; 252/403; 252/405; 524/98; 524/99; 524/100; 524/102; 524/103; 524/106
[58] Field of Search ............ 260/45.8 NH, 45.8 NP; 252/401, 403; 524/92, 98, 100, 102, 106

[56] References Cited

U.S. PATENT DOCUMENTS

| | | | |
|---|---|---|---|
| 3,491,057 | 1/1970 | Kato et al. | 260/45.8 NB |
| 3,497,512 | 2/1970 | Hofer et al. | 260/45.8 NH |
| 3,640,928 | 2/1972 | Murayama et al. | 260/45.8 NP |
| 3,992,390 | 11/1976 | Holt et al. | 260/45.8 NP |
| 4,035,323 | 7/1977 | Mathis | 260/45.8 NP |

OTHER PUBLICATIONS

Dictionary of Organic Compounds, 4th Ed., 1965, p. 2740.

Primary Examiner—John Kight, III
Assistant Examiner—R. A. White

[57] ABSTRACT

Light stabilizers for synthetic resin compositions and synthetic resin compositions containing such stabilizers are provided, comprising
(1) at least one hindered heterocyclic amine having the formula:

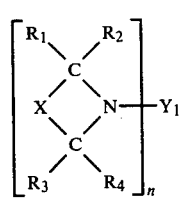

(I)

wherein:
X is a bivalent linking radical forming with the ring structure

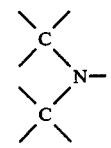

a nitrogen-containing heterocyclic ring having from five to seven ring atoms, preferably piperidine;
$R_1$ and $R_2$ are each selected from the group consisting of lower alkyl, preferably methyl, and $R_1$ and $R_2$ taken together as pentylene $(CH_2)_5$;
$R_3$ and $R_4$ are each selected from the group consisting of lower alkyl, and $R_3$ and $R_4$ taken together as one of butylene—$(CH_2)_4$, pentylene—$(CH_2)_5$, and $CH_2$—$C(CH_3)_2$—$NH$—$C(CH_3)_2$—$CH_2$—;
n is 1 or 2; and
when n is 1, $Y_1$ is selected from the group consisting of hydrogen, O•, OH, alkyl, alkenyl, alkynyl, aralkyl and acyl having from one to about thirty carbon atoms; and
when n is 2, $Y_1$ is selected from the group consisting of alkylene, alkenylene, alkynylene, cycloalkylene and aralkylene having from one to about thirty carbon atoms; together with
(2) at least one heterocyclic acid hydrazide having the formula:

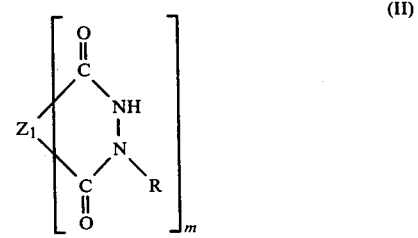

(II)

wherein:
R is selected from the group consisting of hydrogen, alkyl, aryl and such groups having hydroxyl, carboxylic acid ester, oxyether and carbonyl groups having from one to about thirty carbon atoms;

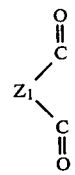

is the residue of a dicarboxylic or tetracarboxylic acid, wherein Z is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and
m is 1 or 2.

In such combinations, the heterocyclic acid hydrazide, which alone is not a light-stabilizer, synergizes the stabilizing effectiveness of the hindered heterocyclic amine.

29 Claims, No Drawings

SYNERGISTIC LIGHT STABILIZER COMPOSITIONS FOR SYNTHETIC RESINS AND RESIN COMPOSITIONS CONTAINING THE SAME

This is a continuation of application Ser. No. 954,815 filed Oct. 26, 1978, now abandoned.

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

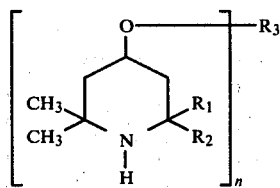

or a salt thereof.

In the above formula:

$R_1$ and $R_2$ which may be the same or different, each are an alkyl group such as methyl, ethyl, isopropyl or dodecyl, or they form, together with the carbon atom to which they are attached, a saturated alicyclic group such as:

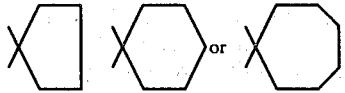

or a group of the formula

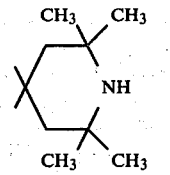

n is an integer of 1 to 3 inclusive; and
$R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

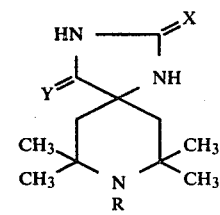

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

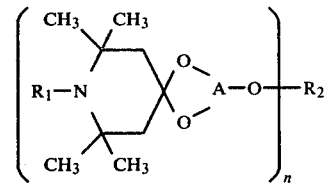

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when n is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

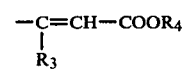

in which $R_3$ represents hydrogen atom, a lower alkyl group or phenyl group and $R_4$ represents an alkyl group;

when n is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when n is 3, $R_2$ represents an aromatic triacyl group or a trivalent group from an oxoacid; and when n is 4, $R_2$ represents an aromatic tetraacyl group, and A represents a group

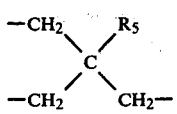

in which

R₅ represents hydrogen atom or a lower alkyl group or, when n is 1, R₅ may represent together with R₂ a group

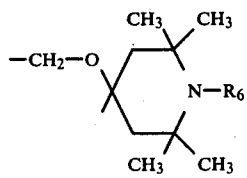

in which

R₆ represents the same group as defined in R₁ and may be the same or different from R₁, or a group

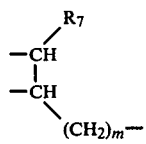

in which m is 1 or 2 and R₇ represents hydrogen atom or, when n and m are 1, R₇ represents methylene group together with R₂.

Murayama et al U.S. Pat. No. 3,840,494, patented Oct. 8, 1974 provides acid esters of 4-piperidinol derivatives having the formula:

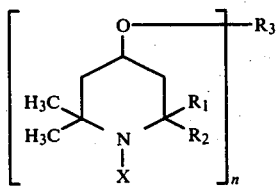

wherein

R₁ and R₂ may be the same or different and represent an alkyl group of one to four carbon atoms or they may form, together with the carbon atom to which they are attached, a saturated alicyclic group or the group of the formula:

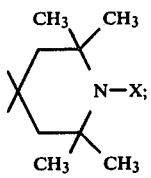

X is hydrogen atom, oxygen free radical (—O•) or an alkyl group of one to four carbon atoms;

n is an integer of 1 through 4 inclusive; and R₃ represents, when n is 1, an acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, a tetraacyl group derived from an aromatic tetracarboxylic acid or a tetravalent group obtained by eliminating four hydroxyl groups from orthosilicic acid.

Murayama et al U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidino spiro derivatives having the formula:

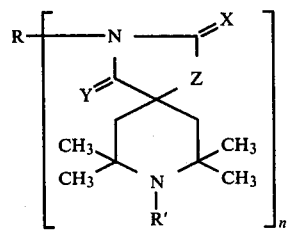

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R" in which R" is hydrogen atom, an alkyl group or a substituted alkyl group;

Z represents oxygen atom or a group of the formula >N—R'" is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group; when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group, when n is 3, an alkanetriyl group, a tris(acyloxyalkylene) group, an alkane-tris-(oxycarbonylalkyl) group or a group of the group

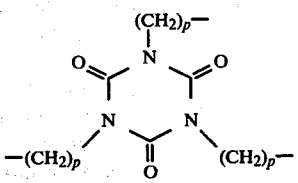

in which p is an integer of 1 through 8 inclusive, and when n is 4, an alkane tetrayl group, a tetrakis-(acyloxyalkylene) group or an alkanetetrakis-(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

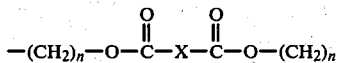

in which n is an integer of 1 or 2 and X is an alkylene group, or o-, m- or p-phenylene group or the carbon atoms of CO groups may be directly joined in the absence of X or a group of the formula:

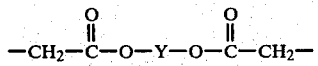

in which

Y is an alkylene group or o-, m- or p-phenylene group.

Ramey et al U.S. Pat. Nos. 3,875,169 patented Apr. 1, 1975 and 3,991,012 patented Nov. 9, 1976 provide bicyclic hindered amines of the formula:

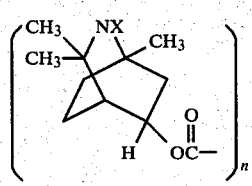

wherein

X is H, O, or OH, n is 1 or 2, and (a) when n is 1, R is straight- or branched-chain alkyl having one to twenty carbon atoms, phenyl or phenyl substituted by one or more lower alkyl groups, and (b) when n is 2, R is straight- or branched-chain alkylene having one to twenty carbon atoms, phenylene or phenylene substituted by one or more lower alkyl groups.

Preferred compounds of formula I are those wherein X is H or O; and n is 1 or 2, and (a) when n is 1, R is n-alkyl having one to twenty atoms, and (b) when n is 2, R is n-alkylene having one to twelve carbon atoms.

Ramey et al U.S. Pat. Nos. 3,907,803 patented Sept. 23, 1975 and 4,001,181 patented Jan. 4, 1977 provide hindered piperidine carboxamide acids and metal salts thereof of the formula:

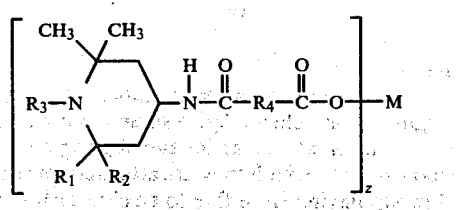

wherein $R_1$ and $R_2$ independently of each other are straight- or branched-chain lower alkyl having one to six carbon atoms, or together with the carbon to which they are bound form a cyclopentyl or cyclohexyl ring, which is unsubstituted or substituted with a methyl group, $R_3$ is hydrogen, alkyl having one to twelve carbon atoms, β-methoxyethyl alkenyl having three or four carbon atoms, propargyl, benzyl, or alkyl-substituted benzyl, $R_4$ is straight- or branched-chain alkylene having one to eight carbon atoms, phenylene, phenylene substituted with one or more alkyl groups, or the group —($CH_2$)$_m$Y($CH_2$)$_n$—, wherein Y is oxygen or sulfur and m and n independently of each other are an integer of from 1 to 3, M is hydrogen or a metal selected from the group consisting of barium, nickel, manganese, calcium, zinc, iron, sodium, cobalt, tin, dialkyl tin, and z has a value of from 1 to 4, the value of z being the same as the available valence of M.

Ramey et al U.S. Pat. Nos. 3,899,491, patented Aug. 12, 1975 and 3,920,659, patented Nov. 18, 1975, disclose alkyl alkanoate derivatives of substituted piperazines and substituted piperazinodiones. The substituted piperazines of No. 3,899,491 have the formula:

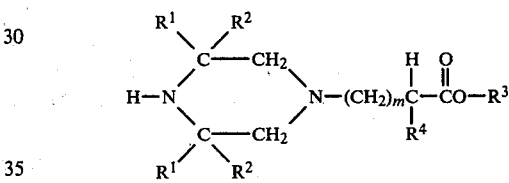

wherein $R^1$ and $R^2$ are methyl or together with the carbon to which they are bound form a mono-cyclic ring system having five or six carbon atoms;

$R^3$ is an alkyl group of from one to twenty atoms;

$R^4$ is hydrogen or methyl, and m is 0 or 1.

The substituted piperazinodiones of U.S. Pat. No. 3,920,659 have the formula:

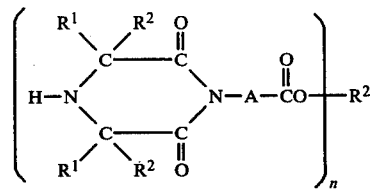

wherein $R^1$ and $R^2$ are independently of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower) alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

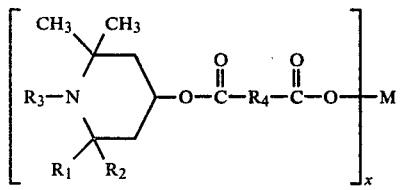

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al U.S. Pat. No. 3,939,163 patented Feb. 17, 1976 disclose closely similar compounds in which $R_4$ is alkylene having from one to four carbon atoms.

Randell et al U.S. Pat. No. 3,939,170 patented Feb. 17, 1976 disclose dehydropyridinyl sulphides, sulphoxides and sulphones having the formula:

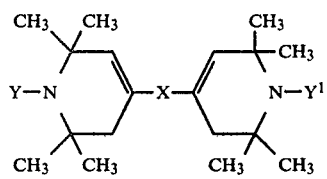

wherein

X is S, SO or $SO_2$ and Y and $Y^1$ are the same or different and each is H, OH, O— or a straight- or branched alkyl residue having from one to four carbon atoms, and salts thereof when Y and $Y^1$ are other than O—.

Randell et al in published patent application No. B408,123 published Apr. 13, 1976 disclose substituted piperidine-4-ols having the formula:

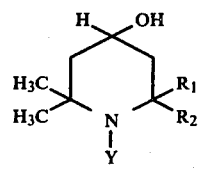

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

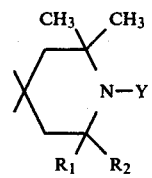

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —$CH_2X$ wherein X is the group

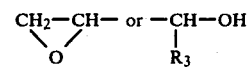

wherein $R_3$ is hydrogen, a methyl or phenyl residue, the group

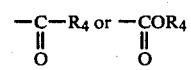

wherein $R_4$ is an alkyl residue having from one to twenty carbon atoms.

Cook U.S. Pat. No. 3,929,804 patented Dec. 30, 1975 discloses 4-piperidine acetamide compounds having the formula:

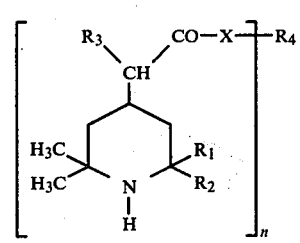

I wherein $R_1$ and $R_2$ are the same or different and each is a straight- or branched alkyl residue having from one to twelve carbon atoms, or $R_1$ and $R_2$ together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or >$NR_5$, wherein $R_5$ has the same significance as $R_3$; and n is 2, 3 or 4;

as well as salts of the amine function of the compounds of formula I.

Cook U.S. Pat. No. 3,939,168 patented Feb. 17, 1976 discloses closely similar compounds having a Y substituent on the piperidyl nitrogen atom, Y being alkyl, alkenyl, aralkyl or a group

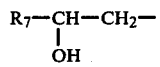

wherein $R_7$ is hydrogen, alkyl or phenyl.

Randell et al U.S. Pat. No. 3,939,170, patented Feb. 17, 1976 provides di-4-(3,4-dehydro-2,2,6,6-tetramethyl piperidinyl)sulphides, sulphoxides and sulphones having the formula:

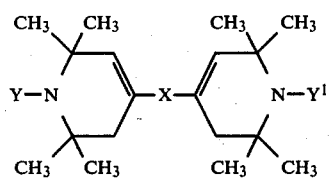

wherein

X is S, SO or $SO_2$ and Y and $Y^1$ are the same or different and each is H, OH, O° or a straight- or branched-alkyl residue having from one to four carbon atoms, and salts thereof when Y and $Y^1$ are other than 0°.

Preferably X is S.

Smith et al U.S. Pat. No. 3,954,779, patented May 4, 1976 provides 4-(4'-hydroxycyclohexyl)2,2,6,6-tetramethyl piperidines and derivatives thereof having the formula:

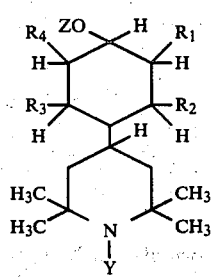

and salts thereof, wherein $R_1$, $R_2$, $R_3$ and $R_4$ are the same or different and each is hydrogen, an alkyl residue having from one to nine carbon atoms, a cycloalkyl residue having from five to fourteen carbon atoms or a cycloalkyl-alkyl residue having from seven to fourteen carbon atoms;

Y is hydrogen;

O an alkyl residue having from one to four carbon atoms, or an aralkyl residue having from seven to twelve carbon atoms; and Z is hydrogen, an unsubstituted or substituted alkyl residue having from one to twenty carbon atoms, an alkenyl or alkynyl residue having from two to twenty carbon atoms, a cycloalkyl residue having from five to twelve carbon atoms, an aralkyl residue having from seven to twelve carbon atoms, an aryl residue having from six to twelve carbon atoms, or the group having the formula:

—$COZ_1$ wherein $Z_1$ has the same significance as Z as hereinbefore defined or $Z_1$ is a group —$NR_5R_6$ wherein $R_5$ is hydrogen or an alkyl residue having from one to four carbon atoms and $R_6$ is hydrogen, an alkyl residue having from one to twenty carbon atoms, a cycloalkyl residue having from five to twelve carbon atoms, an aralkyl residue having from seven to twelve carbon atoms or an aryl residue having from six to twelve carbon atoms.

Cook U.S. Pat. No. 3,959,291, patented May 25, 1976 provides derivatives of substituted 2-piperidinyl-4'-ethyl alcohol having the formula:

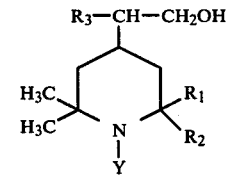

and salts thereof, wherein $R_1$ and $R_2$ are the same or different and each is an alkyl residue having from one to twelve carbon atoms, or $R_1$ and $R_2$, together with the carbon atom to which they are bound, form a cycloalkyl residue having from five to twelve carbon atoms in the ring;

Y is O, hydrogen, a straight- or branched-alkyl residue having from one to twenty carbon atoms, an alkenyl or alkynyl residue having from three to twelve carbon atoms, an aralkyl residue having from seven to twelve carbon atoms or a group having the formula:

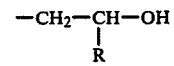

wherein

R is hydrogen, or a methyl or phenyl residue, and $R_3$ is hydrogen, or a straight- or branched-chain alkyl residue having from one to twelve carbon atoms.

Cook U.S. Pat. No. 3,971,795, patented July 27, 1976 provides N-substituted piperidinylidene derivatives having the formula:

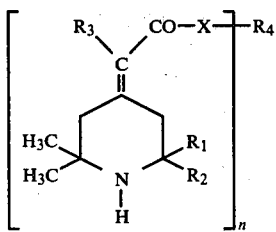

wherein n is 1, 2, 3 or 4,

Y is hydrogen or a straight- or branched-alkyl residue having from one to twelve carbon atoms, an alkenyl residue having from three to twelve carbon atoms or an aralkyl residue having from seven to twelve carbon atoms and $R_1$ and $R_2$ are the same or different and each is a straight- or branched-alkyl residue having from one to twelve carbon atoms, or $R_1$ and $R_2$ together with the carbon atom to which they are attached form a cycloalkyl group having from five to twelve carbon atoms;

$R_3$ is hydrogen, a straight- or branched-alkyl residue having from one to four carbon atoms, an aralkyl residue having from seven to twelve carbon atoms, a cycloalkyl group having five or six carbon atoms;

$R_4$ is a hydrocarbyl residue having from one to twenty carbon atoms being either unsubstituted or substituted by halogen, or interrupted by one or more oxygen or sulphur atoms or $R_4$ is a metal ion, or, when n is 1, $R_4$, in addition, is hydrogen or has the structure:

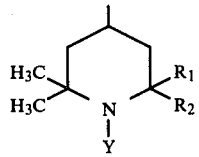

wherein

Y, $R_1$ and $R_2$ have their previous significance,

X is —O—, —S— or >NR$_5$ wherein $R_5$ has the same significance as $R_3$ or when n is 1 in addition $R_5$ and $R_4$ together with the nitrogen atom to which they are bound form a heterocyclic residue having from four to ten carbon atoms;
as well as salts of the amine function of the compound of formula I.

Murayama et al U.S. Pat. No. 3,975,357, patented Aug. 17, 1976 provides 1-substituted piperidine derivatives having the formula:

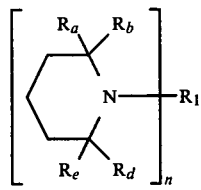

In the above formula, n represents 1 or 2.

$R_1$ represents when n=1, oxyl radical, hydroxy group, an alkyl group, a substituted alkyl group, an alkenyl group, an alkynyl group, an aralkyl group, a substituted aralkyl group or an acyl group, when n=2, an alkylene group (the alkylene chain may optionally be interrupted by an oxygen atom), 2-butenylene group, a group of the formula —CH$_2$COO—R$_7$—O—COCH$_2$— wherein $R_7$ represents an alkylene group or xylylene group, or a group of the formula —CH$_2$CH$_2$—O CO—(R$_8$)$_m$CO O—CH$_2$CH$_2$— wherein m represents 0 or 1, $R_8$ represents an alkylene group (the alkylene chain may optionally be interrupted by a sulfur atom), an alkenylene group, phenylene group or 1,4-cyclohexylene group.

$R_a$ and $R_b$ represent methyl group or $R_a$ and $R_b$ together with carbon atom to which they are attached, form cyclohexyl group.

$R_c$ represents methyl group.

$R_d$ represents an alkyl group having one to five carbon atoms.

$R_c$ and $R_d$ together with carbon atom to which they are attached, may form cyclopentyl group, cyclohexyl group, a group of the formula:

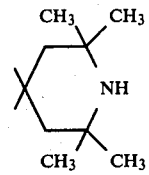

or a group of the formula

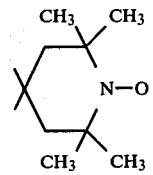

Murayama U.S. Pat. No. 3,975,462, patented Aug. 17, 1976 provides piperidine-spiro-hydantoin derivatives having the formula:

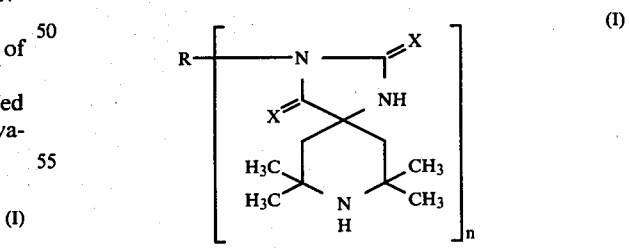

In the above formula (I), X represents oxygen atom or sulfur atom: n is an integer of 1 to 4 inclusive; and R represents when n is 1, an alkenyl group which may be substituted with halogen, an alkynyl group which may be substituted with phenyl, an aralkyl group which may be substituted with halogen, alkyl of one to four carbon atoms or halomethyl, a hydroxyalkyl group, an alkoxyalkyl group, an alkenyloxyalkyl group, an aryloxyalkyl group, an alkylthioalkyl group, an acyloxyalkyl group, an epoxyalkyl group, an N-alkyl-substituted aminoalkyl group, an alkoxycarbonyl alkyl group, an aryloxycarbonylalkyl group, an aliphatic acyl group, an alkoxycarbonyl group, a phosphino group which is substituted with phenoxy or alkoxy or a phosphinyl group which is substituted with phenoxy or alkoxy, when n is 2, an alkenylene group of four to eighteen carbon atoms, a dialkylene ether group, an aralkylene group, a bis-(acyloxyalkylene)group, or an alkylene-bis-(oxycarbonylalkyl)group, when n is 3, a tris-(acyloxyalkylene)group, an alkanetris-(oxycarbonylalkyl)group or a group of the formula:

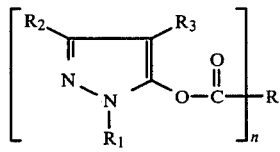

in which p is an integer of 1 to 8 inclusive and p's may be the same or different, and, when n is 4, a tetrakis (acyloxyalkylene)group.

Ávár et al U.S. Pat. No. 3,976,658, patented Aug. 24, 1976 provides pyrazole derivatives of the formula:

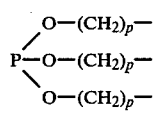

in which $R_1$ is a $C_{1-22}$ alkyl radical, a $C_{5-12}$ cycloalkyl radical, a $C_{6-12}$ cycloalkylalkyl radical, a $C_{7-12}$ aralkyl radical, of which the alkyl radical and the alkyl moiety of the cycloalkyl-alkyl radical are uninterrupted or interrupted by one or two sulphur atoms or by —COO—, and the aryl nucleus of the aralkyl radical is unsubstituted or substituted by a hydroxyl group and/or 1 or 2 $C_{1-12}$ alkyl radicals, or a phenyl group, unsubstituted or substituted by one or more substituents selected from one or two halogen atoms, a cyano group, a hydroxyl group, 1 or 2 $C_{1-12}$ alkyl radicals, 1 or 2 $C_{1-12}$ alkoxy radicals, a phenyl group and the radicals $R_4$—O— and $R_4$—$SO_2$—, wherein $R_4$ is a phenyl group, unsubstituted or substituted by 1 or 2 $C_{1-8}$ alkyl radicals, $R_2$, independently of $R_1$, has one of the significances of $R_1$, or is a cyano group or the radical —$COOR_5$, wherein $R_5$ is a $C_{1-12}$ alkyl radical, a $C_{5-12}$ cycloalkyl radical, a $C_{6-12}$ cycloalkyl-alkyl radical or a phenyl group, unsubstituted or substituted by a hydroxyl group and/or 1 or 2 $C_{1-8}$ alkyl radicals, $R_3$ is a hydrogen atom or one of the significances of $R_1$, —$COR_1$ or —$COOR_5$, n is 1, 2 or 3, and R, when n is 1, is a phenyl group, unsubstituted or substituted by a total of up to 3 substituents selected from 1 hydroxyl group, one to three halogen atoms, 1 phenyl group, 1 benzyl group, 1 phenoxy group, 1 to 3 alkyl radicals each containing one to eight carbon atoms and the sum of the carbon atoms not exceeding twelve, and 1 to 3 alkoxy radicals each containing one to twenty-two carbon atoms and the sum of the carbon atoms not exceeding twenty-two, or a monovalent naphthalene radical, or a monovalent radical of thiophene, benzothiophene, dibenzothiophene, furan, benzofuran, or dibenzofuran, and when n is 2, is a phenylene group, unsubstituted or substituted by a $C_{1-4}$ alkyl radical and/or a halogen atom, or a divalent naphthalene radical, or a divalent radical of thiophene or dibenzofuran, and when n is 3, is a 1,3,5-trivalent benzene radical.

Murayama et al, U.S. Pat. No. 4,061,616, patented Dec. 6, 1977, provides bipiperidyl derivatives having the following formula (I) or an acid addition salt thereof:

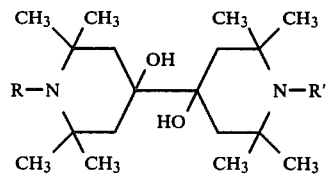

wherein

R and R', which may be the same or different, and each represents hydrogen atom, an alkyl group, an alkenyl group, an alkynyl group, an aralkyl group, a hydroxyalkyl group, an alkoxyalkyl group, an aliphatic or aromatic acyloxyalkyl group, a cyanoalkyl group, a halogenoalkyl group, an epoxyalkyl group, an alkoxycarbonylalkyl group, an aliphatic acyl group, an alkoxycarbonyl group or an aralkoxycarbonyl group.

Murayama U.S. Pat. No. 4,066,615 patented Jan. 3, 1978, provides stabilizers having the formula:

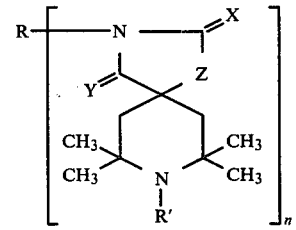

wherein:

R' represents an alkyl, an acyl, an alkoxycarbonyl, an amino or nitroso group;

X represents oxygen or sulfur;

Y represents oxygen, sulfur or a group of the formula=N—R" in which R" is hydrogen or alkyl;

Z represents oxygen or a group of the formula >-N—R'" in which R'" is hydrogen or alkyl;

n is an integer of 1 to 4; and

R represents, when n is 1, alkyl, aryl, cycloalkyl, alkoxycarbonyl, substituted phosphino or substituted phosphinyl, when n is 2, alkylene, alkenylene, arylene, aralkylene; alkylenediphenylene, bis-(carboxycarbonyl) alkylene, alkylene-bis-(oxycarbonylalkyl), dialkylene ether or diphenylene ether, when n is 3, alkanetriyl, tris-(alkoxycarbonyl)alkanetriyl, alkanetriyl-tris-(oxycarbonylalkyl) or a group of the formula

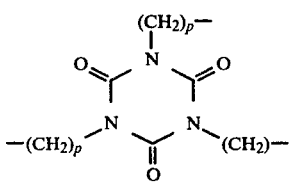

in which p is an integer of 1 through 8 inclusive, and, when n is 4, alkanetetrayl, tetrakis-(alkoxycarbonyl)alkanetetrayl or alkanetetrayl-tetrakis(oxycarbonylalkyl).

Soma et al U.S. Pat. No. 4,097,587 patented June 27, 1978 provides 7,7,9,9-tetra-substituted-1,3,8-triazaspiro [4.5]decane-2,4-diones having an alkyl or allyl group at either the 6- or the 10- position which are said to be useful for the stabilization of polymers against photo- and thermal- deterioration.

These compounds have the formula:

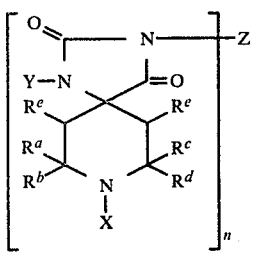

(I)

wherein:

$R^a$ represents a methyl group;

$R^b$ represents a lower alkyl group;

$R^c$ represents an alkyl group;

$R^d$ represents an alkyl group, a phenyl group or an aralkyl group; or $R^c$ and $R^d$, together with the carbon atom to which they are attached, represent a cycloalkyl group;

one of $R^e$ and $R^{e'}$ represents a hydrogen atom and the other of $R^e$ and $R^{e'}$ represents a lower alkyl group or an allyl group;

n is 1 or 2;

Y represents a hydrogen atom or, when neither X nor Z represents a hydrogen atom, Y represents a hydrogen atom, a methyl group, an ethyl group, an allyl group or a benzyl group;

X represents a hydrogen atom, an oxyl radical, a lower alkyl group, an alkenyl group, a benzyl group, a 2,3-epoxypropyl group or a group of formula—$CH_2$CH$_2$OR$^1$ (wherein R$^1$ represents a hydrogen atom or an aliphatic, aromatic, araliphatic or alicyclic acyl group);

when n=1:

Z represents a hydrogen atom, an alkyl group, an alkenyl group, an aralkyl group which is unsubstituted or has one or more substituents in its aryl moiety, an aryl group which is unsubstituted or has one or more chlorine and/or methyl substituents, a cyclohexyl group, a 2,3-epoxypropyl group, an alkoxyalkyl group, a phenoxyalkyl group, a group of formula—CH$_2$COOR$^2$ (wherein R$^2$ represents an alkyl group or a phenyl group) or a group of formula

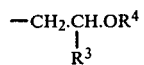

(wherein $R^3$ represents a hydrogen atom, a methyl group or a phenyl group, and $R^4$ represents a hydrogen atom or an aliphatic, aromatic, araliphatic or alicyclic acyl group);

when n=2:

Z represents an alkylene group, which is optionally interrupted by an oxygen atom, a 2-butylene group, a xylylene group; an arylene group which is unsubstituted or has one or more methyl substituents, a group of formula

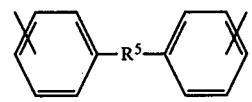

(wherein $R^5$ represents an oxygen atom or a methylene group), a group of formula—$CH_2$.COOR$^6$OCO.CH$_2$—(wherein $R^6$ represents an alkylene group) or a group of formula

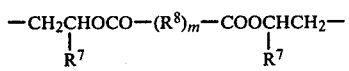

(wherein $R^7$ represents a hydrogen atom, a methyl group or a phenyl group, m is 0 or 1 and $R^8$ represents an alkylene group optionally interrupted by a sulphur atom, an alkenylene group, a phenylene group or a 1,4-cyclohexylene group);

and acid addition salts thereof.

Mayer et al U.S. Pat. No. 4,097,452 patented June 27, 1978 provides diazadispiro-hexadecane compounds having the formula:

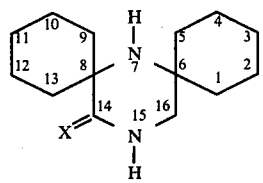

wherein X means=O, =NH or

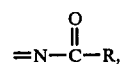

R being an alkyl group with 1 to 17 carbon atoms, preferably the methyl group, for the stabilization of organic matter against the decomposition by light and heat.

In accordance with the present invention, light stabilizers for organic polymeric materials are provided comprising (1) at least one hindered heterocyclic amine having the formula:

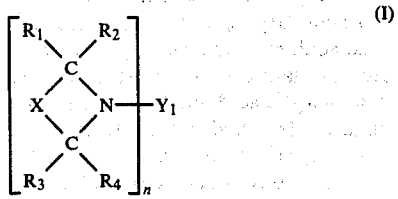   (I)

wherein:

X is a bivalent linking radical forming with the ring structure

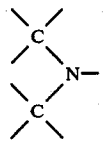

a nitrogen-containing heterocyclic ring having from five to seven ring atoms, preferably piperidine;

$R_1$ and $R_2$ are each selected from the group consisting of lower alkyl, preferably methyl, and $R_1$ and $R_2$ taken together as pentylene $(CH_2)_5$;

$R_3$ and $R_4$ are each selected from the group consisting of lower alkyl, and $R_3$ and $R_4$ taken together as one of butylene—$(CH_2)_4$, pentylene-$(CH_2)_5$, and $CH_2$—$C(CH_3)_2$—$NH$—$C(CH_3)_2$—$CH_2$—;

n is 1 or 2; and when n is 1, $Y_1$ is selected from the group consisting of hydrogen, O•, OH, alkyl, alkenyl, alkynyl, aralkyl and acyl having from one to about thirty carbon atoms; and when n is 2, $Y_1$ is selected from the group consisting of alkylene, alkenylene, alkynylene, cycloalkylene and aralkylene having from one to about thirty carbon atoms;

together with (2) at least one heterocyclic acid hydrazide having the formula:

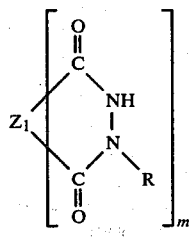   (II)

wherein:

R is selected from the group consisting of hydrogen, alkyl, aryl and such groups having hydroxyl, carboxylic acid ester, oxyether and carbonyl groups having from one to about thirty carbon atoms;

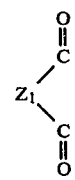

$Z_1$ is the residue of a dicarboxylic or tetracarboxylic acid, wherein Z is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2.

In such combinations, the heterocyclic acid hydrazide, which alone is not a light-stabilizer, synergizes the stabilizing effectiveness of the hindered heterocyclic amine.

A preferred class of the hindered heterocyclic amine compounds is the hindered 2,2,6,6-tetrasubstituted piperidines havine one of the formulae:

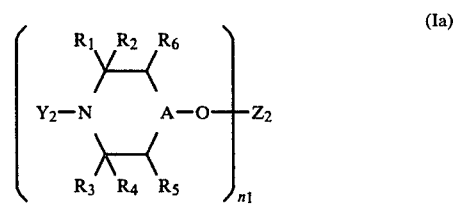   (Ia)

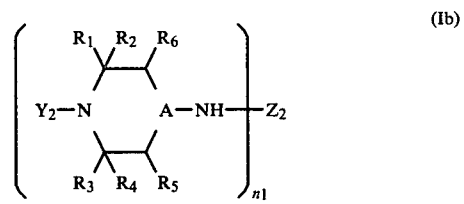   (Ib)

wherein:

$R_1$ and $R_2$ are each selected from the group consisting of lower alkyl, and $R_1$ and $R_2$ taken together as pentylene $(CH_2)_5$;

$R_3$ and $R_4$ are each selected from the group consisting of lower alkyl and $R_3$ and $R_4$ taken together or as one of butylene-$(CH_2)_4$, pentylene—$(CH_2)_5$, and —$CH_2$—$C(CH_3)_2$—$NH$—$C(CH_3)_2$—$CH_2$—;

$R_5$ and $R_6$ are selected from the group consisting of hydrogen and lower alkyl;

A is

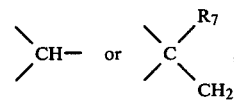

wherein $R_7$ is lower alkyl;

$n_1$ is a number from 1 to 6; and $Y_2$ is selected from the group consisting of hydrogen, O•, OH, alkyl, alkenyl, alkynyl, aralkyl and acyl having from one to about thirty carbon atoms; and $Z_2$ is the residue of a carboxylic acid having from one to about thirty carbon atoms or an inorganic oxyacid of phosphorus, silicon, boron or carbon.

Exemplary R, $R_1$, $R_2$, $R_3$, $R_4$, $R_5$, $R_6$, and $R_7$, $Y_1$ and $Y_2$ alkyl in formulae I, Ia, Ib and II are methyl, ethyl, n-propyl, isopropyl, n-butyl, isobutyl, tertiary butyl, secondary butyl, n-amyl, isoamyl, tertiary amyl, n-hexyl, isohexyl, secondary hexyl, tertiary hexyl, heptyl, isoheptyl, octyl, tert-octyl, 2-ethyl hexyl, nonyl, decyl, undecyl, dodecyl, tridecyl, tetradecyl, hexadecyl, and octadecyl.

The term "lower alkyl" refers to alkyl having from one to four carbon atoms.

Exemplary R, $R_1$, $R_2$, $R_3$, $R_4$, $R_5$, $R_6$ and $R_7$, $Y_1$ and $Y_2$ alkenyl in formulae I, Ia, Ib and II are ethenyl, propenyl, n-butenyl, isobutenyl, tertiary butenyl, secondary butenyl, n-amylenyl, isoamylenyl, tertiary amylenyl, n-hexenyl, isohexenyl, secondary hexenyl, tertiary hexenyl, heptenyl, isoheptenyl, octenyl, tert-octenyl, 2-ethyl hexenyl, nonenyl, decenyl, undecenyl, dodecenyl, tridecenyl, tetradecenyl, hexadecenyl, and octadecenyl.

Exemplary R, $R_1$, $R_2$, $R_3$, $R_4$, $R_5$, $R_6$, and $R_7$, $Y_1$ and $Y_2$ alkynyl in formulae I, Ia, Ib and II are ethynyl, propynyl, n-butynyl, isobutynyl, tertiary butynyl, secondary butynyl, n-amylynyl, isoamylynyl, tertiary amylynyl, n-hexynyl, isohexynyl, secondary hexynyl, tertiary hexynyl, heptynyl, isoheptynyl, octynyl, tert-octynyl, 2-ethyl hexynyl, nonynyl, decynyl, undecynyl, dodecynyl, tridecynyl, tetradecynyl, hexadecynyl, and octadecynyl.

Exemplary R, $R_1$, $R_2$, $R_3$, $R_4$, $R_5$, $R_6$ and $R_7$, $Y_1$ and $Y_2$ cycloalkylene in formulae I, Ia, Ib and II include cyclopropylene, cyclobutylene, cycloalkylene, cyclopentylene, cyclohexylene, cycloheptylene, cyclodecylene, cyclododecylene and cyclooctadecylene.

Exemplary $Y_1$ and $Y_2$ alkylene include methylene, ethylene, propylene, n-butylene, isobutylene, tertiary butylene, secondary butylene, n-amylene, isoamylene, tertiary amylene, n-hexylene, isohexylene, secondary hexylene, tertiary hexylene, heptylene, isoheptylene, octylene, tert-octylene, 2-ethyl hexylene, nonylene, decylene, undecylene, dodecylene, tridecylene, tetradecylene, hexadecylene, and octadecylene.

Exemplary $Y_1$ and $Y_2$ alkynylene include ethynylene, propynylene, isopropynylene, n-butynylene, isobutynylene, tertiary butynylene, secondary butynylene, n-amylynylene, isoamylynylene, tertiary amylynylene, n-hexylynylene, isohexylynylene, secondary hexynylene, tertiary hexynylene, heptynylene, isoheptynylene, octynylene, tert-octynylene, 2-ethyl hexynylene, nonynylene, decynylene, undecynylene, dodecynylene, tridecynylene, tetradecynylene, hexadecynylene and octadecynylene.

Exemplary $Y_1$ and $Y_2$ aralkyl and aralkylene include tolyl, tolylene, xylyl, xylylene, mesityl, mesitylene, methylene naphthyl and ethylene naphthyl.

Exemplary $Y_1$ and $Y_2$ acyl include acetyl, propionyl, butyroyl, valeroyl, lauroyl, caproyl, capryloyl, oleoyl, stearoyl, palmitoyl, linoleoyl, linolenoyl, ricinoleoyl, and behenoyl.

Exemplary X bivalent linking radicals include ethylene, $CH_2CH_2$, propylene $(CH_2)_3$, butylene $(CH_2)_4$, 2,2-dimethylpropylene, 2,2-diethyl propylene, 1,3-dimethyl propylene, 1,2,2,3-tetramethyl propylene and such radicals substituted with aliphatic, aromatic and cycloaliphatic carboxylic acid groups. The X radicals are illustrated in compounds 1 to 97, below.

Exemplary $Y_2$ radicals include H, O•, OH, methyl, ethyl, propyl, butyl, hexyl, octyl, chloroethyl, hydroxyethyl, epoxypropyl, cyanoethyl, benzyl, phenylethyl, vinyl allyl, formyl and acetyl.

Exemplary $Z_2$ carboxylic acids are acetic acid, propionic acid, butyric acid, caproic acid, caprylic acid, capric acid, lauric acid, myristic acid, stearic acid, behenic acid, acrylic acid, methacrylic acid, crotonic acid, oleic acid, linoleic acid, ricinoleic acid, hydroxy acetic acid, amino acetic acid, amino crotonic acid, phenylacetic acid, phenoxy acetic acid, 3,5-di-t-butyl-4-hydroxyphenyl propionic acid, laurylthiopropionic acid, benzoic acid, toluic acid, p-t-butyl-benzoic acid, p-hydroxybenzoic acid, salicyclic acid, p-chlorobenzoic acid, p-methoxybenzoic acid, p-nitro-benzoic acid, 3,5-di-t-butyl-4-hydroxybenzoic acid, nicotinic acid, isonicotinic acid, thiophene-2-carboxylic acid, pyroglutamic acid, isonipecotic acid, orotic acid, oxalic acid, malonic acid, succinic acid, glutaric acid, adipic acid, suberic acid, sebacic acid, decanedicarboxylic acid, maleic acid, itaconic acid, acetylene dicarboxylic acid, bis-(3,5-di-t-butyl-4-hydroxybenzyl) malonic acid, thiodipropionic acid, thiodiglycolic acid, methylene bis thioglycolic acid, iminodiacetic acid, tartaric acid, malic acid, thiomalic acid, dihydroxy tartaric acid, epoxy succinic acid, 3,4-di-hydroxy thiophene dicarboxylic acid, 1,4-bis-carboxyethyl piperidine, phthalic acid, isophthalic acid, terephthalic acid, tetrahydrophthalic acid, hexahydrophthalic acid, 5-bicyclo-(2,2,1)heptene-2,3-dicarboxylic acid, 5-bicyclo(2,2,2)heptene-2,3-dicarboxylic acid, propane tricarboxylic acid, butane tricarboxylic acid, butene tricarboxylic acid, nitrilo triacetic acid, citric acid, tris carboxyethyl isocyanurate, tris carboxymethyl isocyanurate, trimellitic acid, butane tetracarboxylic acid, ethylene tetracarboxylic acid, ethylene diamine tetracarboxylic acid, pyromellitic acid, 1,3-bis-(aminomethyl) cyclohexane-N,N,N',N'-tetraacetic acid.

Exemplary inorganic $Z_2$ oxyacids are phosphorous acid, phosphoric acid, phosphonic acid, phosphonous acid, alkyl phosphonic acids, alkyl phosphonous acids, silicic acid, dialkyl silicic acid, boric acid, and carbonic acid.

The $Z_2$ acid residue may be substituted by ester groups $COOR_8$ wherein $R_8$ is alkyl, cycloalkyl or aryl having from one to about thirty carbon atoms.

Two $Z_2$ ester groups can include spiro groups of the formula

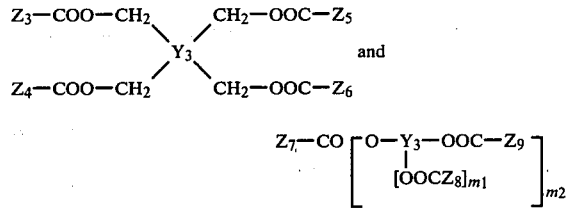

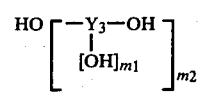

wherein
$m_1$ is a number from 0 to 2;
$m_2$ is a number from 1 to 10;
$Y_3$ is a spiro linking group selected from alkylene and alkylidene, arylene, cycloalkylene and aralkylene having from one to about ten carbon atoms, and is the polyhydric alcohol or phenol from which such groups are derived; and $Z_3$, $Z_4$, $Z_5$, $Z_6$, $Z_7$, $Z_8$ and $Z_9$ are as $Z_2$, above.

Exemplary such polyhydric alcohols are ethylene glycol, diethylene glycol, triethylene glycol, 1,2-propanediol, 1,3-propanediol, 1,2-butanediol, 1,3-butanediol, 1,4-butanediol, neopentyl glycol, thiodiethylene glycol, 1,6-hexanediol, 1,10-decanediol, 1,4-cyclohexanedimethanol, 1,4-phenyldimethanol, hydrogenated bis-phenol A, glycerine, trimethylolethane, trimethylolpropane, tris-(2-hydroxyethyl) isocyanurate, pentaerythritol, neopentyl glycol, sorbitol, mannitol, erythritol and dulcitol.

Exemplary such polyhydric phenols are hydroquinone, 4,4'-isopropylidene diphenol, 4,4'-cyclohexylidene diphenol, 4,4'-methylene bisphenol, 4,4'-sulfobisphenol, 2,5-di-t-butylhydroquinone, trimethylhydroquinone, 2-methyl resorcinol, 2,2'-methylene bis-(4-methyl-6-t-butylphenol), 2,2'-methylene bis-(4-ethyl-6-t-butylphenol), 2,2'-methylene bis-[4-methyl-6-(α-methyl cyclohexyl)phenol], 2,2'-n-butylidene bis-(4,6-dimethylphenol), bis-1,1-(2'-hydroxy-3',5'-dimethylphenyl)-3,5,5-trimethylhexane, 2,2'-cyclohexylidene bis-(4-ethyl-6-t-butylphenol), 2,2'-thio bis-(4-t-butyl-6-methylphenol), 2,2'thio bis-(4-methyl-6-t-butylphenol), 2,2'-thio bis-(4,6-di-t-butylphenol), 4,4'-methylene bis-(2-methyl-6-t-butylphenol), 4,4'-isopropylidene bis-(2-phenylethylphenol), 4,4'-n-butylidene bis-(3-methyl-6-t-butylphenol), 4,4'-cyclohexylidene bis-(2-t-butylphenol), 4,4'-cyclohexylidene bis-(2-cyclohexylphenol), 4,4'-benzylidene bis-(2-t-butyl-5-methylphenol), 4,4'-oxo bis-(3-methyl-6-isopropylphenol), 4,4'-thio bis-(2-methyl-6-t-butylphenol), 4,4'-thio bis-(3-methyl-6-t-butyl phenol), 4,4'-sulfo-bis-(3-methyl-6-t-butylphenol), bis-(2-methyl-4-hydroxy-5-t-butylbenzyl)sulfide, 1,1,3-tris-(2'-methyl-4'-hydroxy-5'-t-butylphenyl)butane, 2,2-bis-(3'-t-butyl-4'-hydroxyphenyl)-4-(3'', 5''-di-t-butyl-4''-hydroxyphenyl)butane, etc.

Preferred subclasses of compounds falling within Formula I and examples thereof are as follows:

A.

$$Y_3-N \begin{array}{c} \diagup C(CH_3)_2-CH_2 \diagdown \\ \diagdown C(CH_3)_2-CH_2 \diagup \end{array} CH-Z'_3$$

| No. | $Y_3$ | $Z'_3$ |
|---|---|---|
| 1. | H | —OCO—cyclohexyl |
| 2. | H | —OCO—(2-hydroxyphenyl) |
| 3. | H | —OCOC$_7$H$_{15}$(n) |
| 4. | H | —OCOC$_{17}$H$_{35}$(n) |
| 5. | H | —OCOCH$_2$CH$_2$—(3,5-di-t-C$_4$H$_9$-4-hydroxyphenyl) |
| 6. | H | —OCO—(3,5-di-t-C$_4$H$_9$-4-hydroxyphenyl) |
| 7. | CH$_3$ | —OCO—phenyl |
| 8. | CH$_3$ | —OCO—(2-hydroxyphenyl) |
| 9. | CH$_3$ | —OCOC$_{17}$H$_{35}$(n) |

-continued
| | | |
|---|---|---|
| 10. | CH$_3$ | 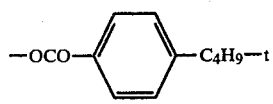 |
| 11. | H | 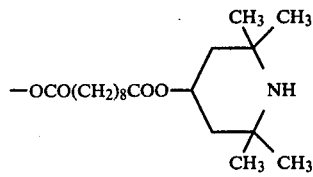 |
| 12. | H | 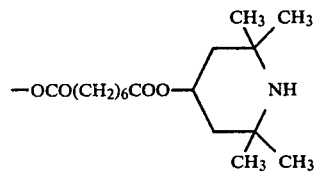 |
| 13. | H | 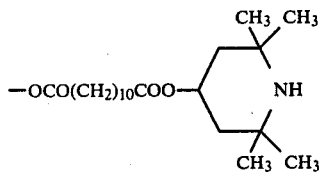 |
| 14. | CH$_3$ | 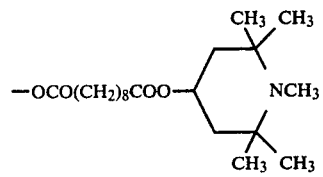 |
| 15. | C$_3$H$_7$ | —OCOC$_7$H$_{15}$(n) |
| 16. | CH$_2$CH=CH$_2$ | —OCOC$_7$H$_{15}$(n) |
| 17. | H | 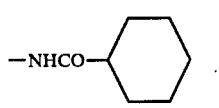 |
| 18. | H | —NHCOCH=CH$_2$ |
| 19. | H | —NHCOC$_{17}$H$_{35}$(n) |
| 20. | H | 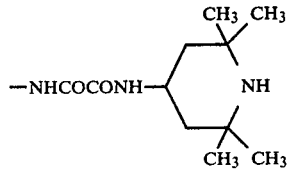 |
| 21. | H | 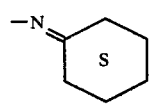 |

| | | |
|---|---|---|
| 28. | H | 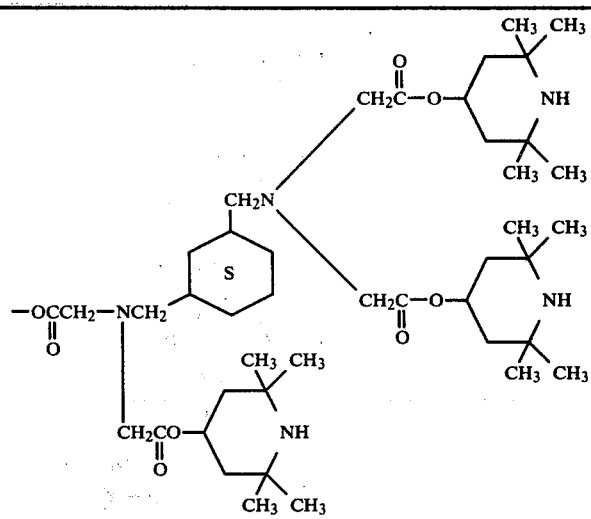 |
| 39. | H | 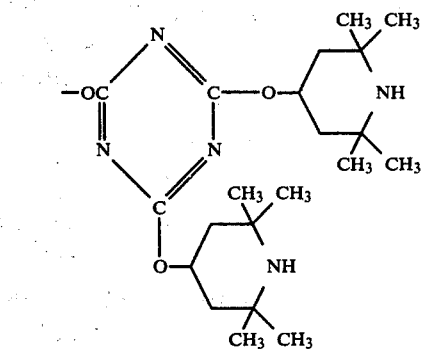 |
| 40. | CH$_3$ | 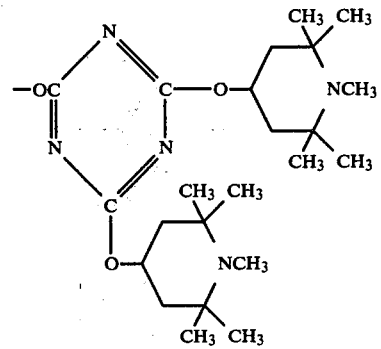 |
| 41. | H | 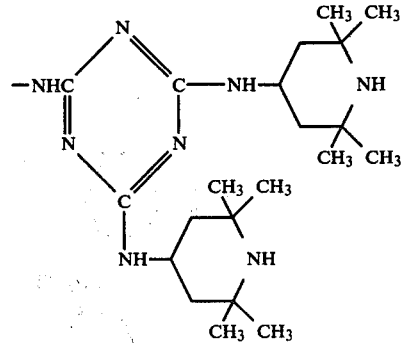 |
| 42. | H | —OCH$_2$CH$_2$CN |
| 43. | CH$_3$ | —OCC$_{11}$H$_{23}$(n)<br>‖<br>O |

-continued
| | | |
|---|---|---|
| 46. | H | —CH$_2$COC$_{18}$H$_{37}$(n)<br>‖<br>O |
| 47. | CH$_3$ | —CH$_2$COC$_2$H$_5$<br>‖<br>O |
| 48. | H | 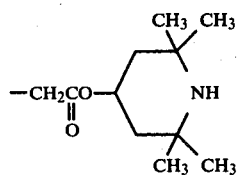 |
| 49. | H | 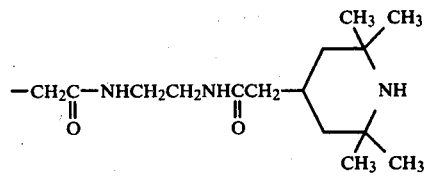 |
| 50. | H | —CH$_2$CH$_2$NHCC$_7$H$_{15}$(n)<br>‖<br>O |
| 51. | H | 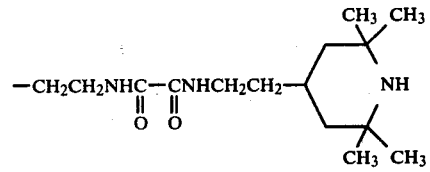 |
| 52. | H | 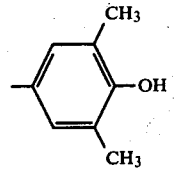 |
| 61. | n-C$_8$H$_{17}$ | H |
| 62. | n-C$_{12}$H$_{25}$ | H |
| 63. | C$_{17}$H$_{35}$COC$_2$H$_4$—<br>‖<br>O | H |
| 64. | n-C$_8$H$_{17}$OCCH$_2$—<br>‖<br>O | H |
| 65. | O· | 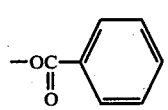 |
| 66. | O· | 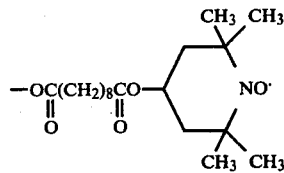 |

| | | |
|---|---|---|
| 67. | H | 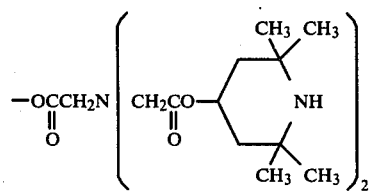 |
| 68. | H | 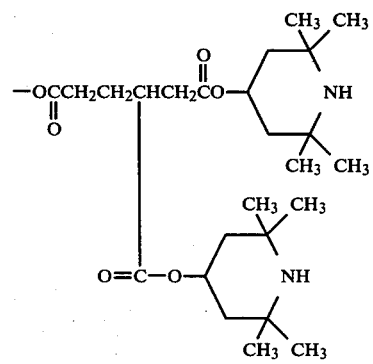 |
| 69. | H | 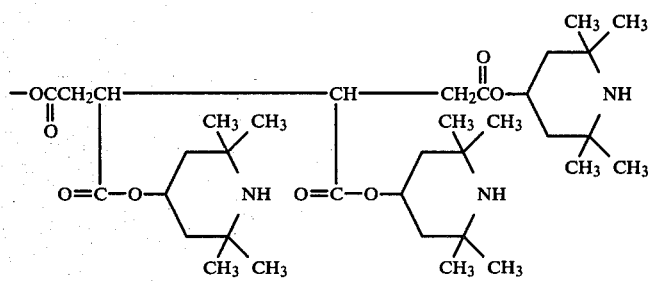 |
| 70. | H | 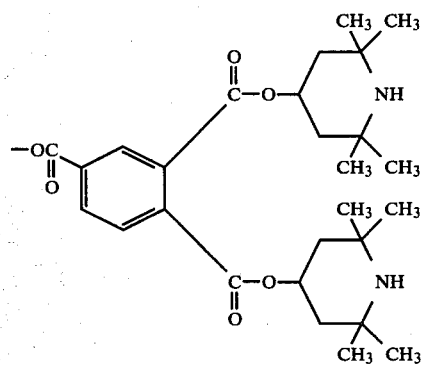 |
| 71. | H | 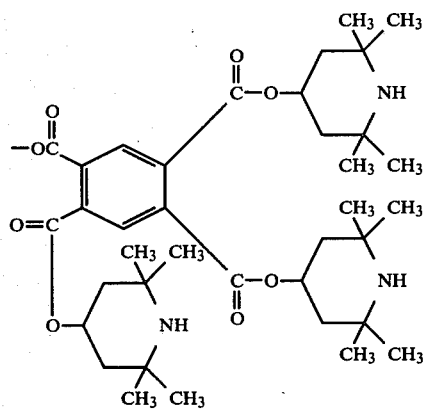 |

-continued
72. H 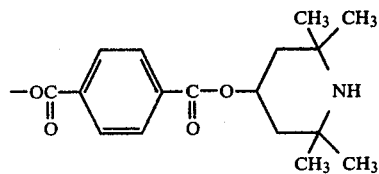
74. H 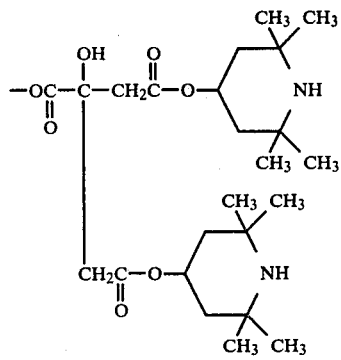
75. H 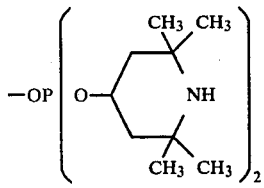
76. H 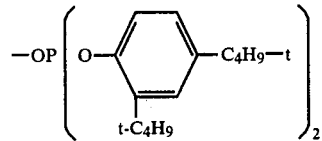
77. H 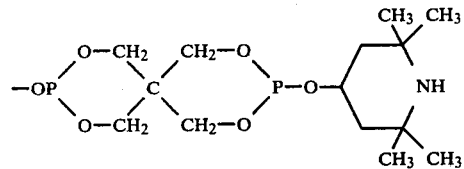
79. H 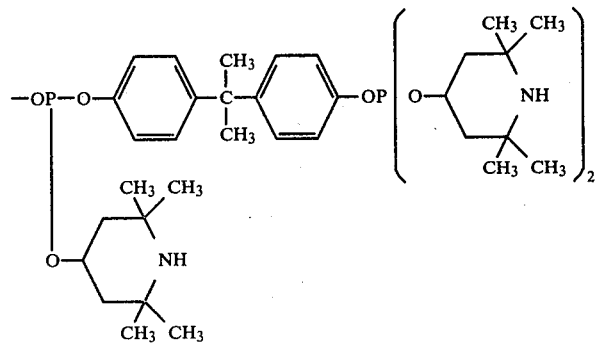

81. H 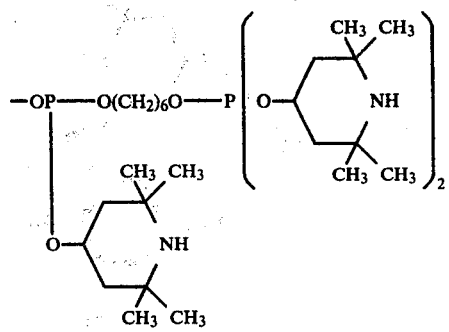
83. H 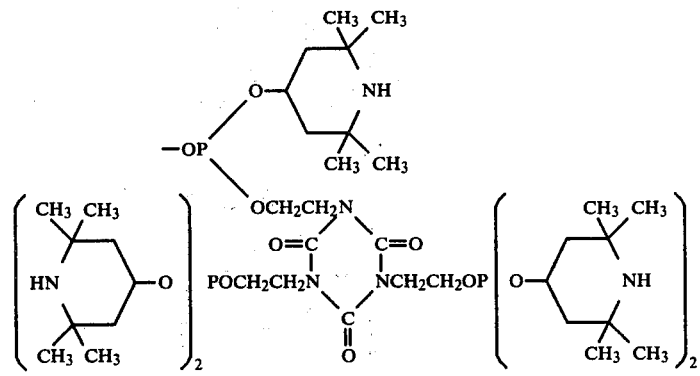
84. H 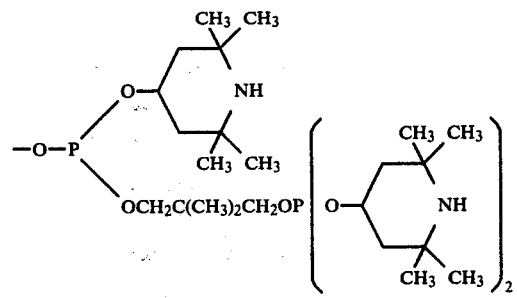
85. H 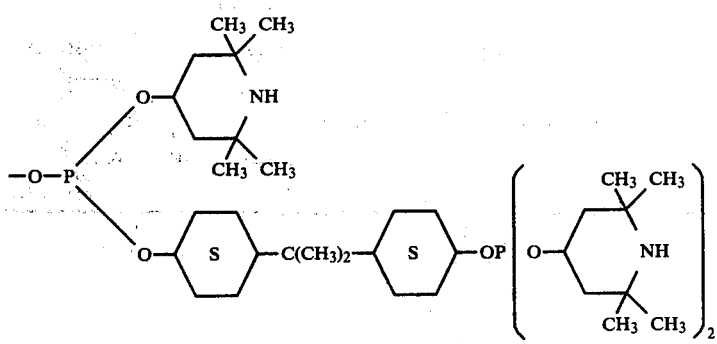
87. H 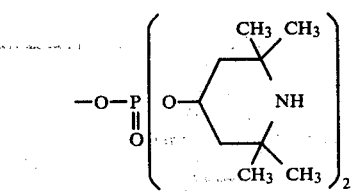

| | | |
|---|---|---|
| 89. | H | 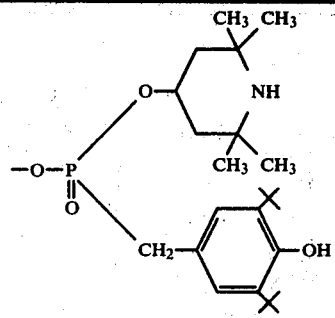 |
| 90. | H | 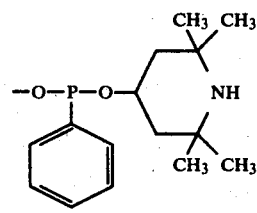 |
| 91. | H | 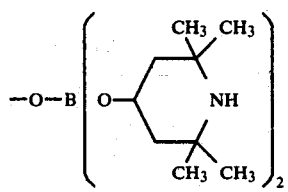 |
| 92. | H | 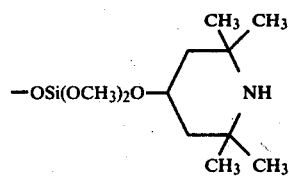 |
| 94. | H | 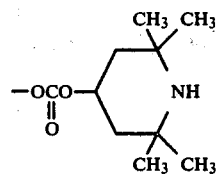 |
| 95. | H | 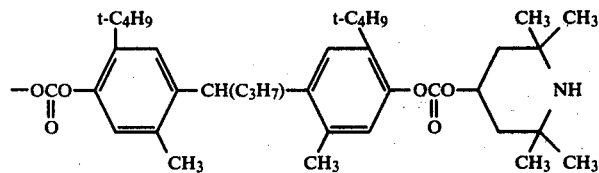 |
B.
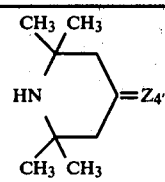
| No. | $Z_{4'}$ |
|---|---|
| 22. | 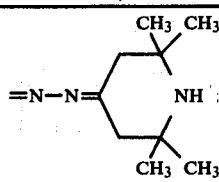 |

-continued
44. =N—OH
45. =CHCOC₂H₅ 
     ‖
     O
53. 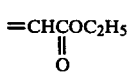
    =N—NHC(CH₂)₄CNH—N=... 2,2,6,6-tetramethylpiperidin-4-ylidene
54. =N—NHCC₇H₁₅(n)
     ‖
     O
C.
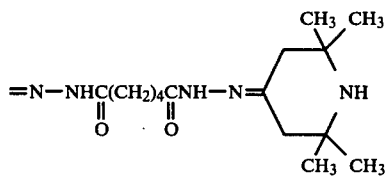
| No. | Y₄ | X₄ | B |
|---|---|---|---|
| 23. | H | H | n-C₄H₉ |
| 24. | CH₃ | H | —n-C₄H₉ |
| 25. | H | H | —n-C₈H₁₇ |
| 26. | CH₃ | H | —n-C₈H₁₇ |
| 27. | H | H | —CH₂—CH=CH₂ |
| 29. | H | H | CH₂—CH—CH₂— \ O / |
| 30. | CH₃ | H | CH₂—CH—CH₂— \ O / |
| 31. | H | H | —C₁₈H₃₇ |
| 32. | H | H | 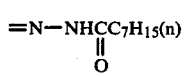 |
| 33. | CH₃ | CH₃ | —CH₃ |
| 34. | CH₃ | CH₃ | 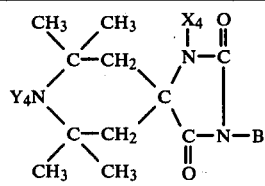 |
| 35. | CH₃ | CH₃ | —CH₂CH₂OCH₂CH₂—N (structure) |
| 36. | CH₃ | H | H |
| 37. | C₆H₅CH₂ | H | —n-C₈H₁₇ |

-continued

D.

[structure: Z₅'—[—OCH₂—C(R₈)(CH₂—O—)(CH₂—O—) bonded to a 2,2,6,6-tetramethylpiperidine ring via the spiro carbon with NH]ₚ]

| No. | R₈ | p | Z₅' |
|---|---|---|---|
| 73. | $C_2H_5$ | 2 | $CH_3N(CH_2\overset{\|}{\underset{O}{C}}-)_2$ |
| 78. | $C_2H_5$ | 2 | [bicyclic phosphite: C(CH₂—O)₂(CH₂—O)P—]₂ |
| 80. | $CH_3$ | 4 | $C_3H_7CH$[—(2-t-$C_4H_9$-5-$CH_3$-phenyl)—O—P<]₂ |
| 82. | H | 6 | structure with $CH_3CHCH_2CH$— on a 2-$CH_3$-4-t-$C_4H_9$-5-OP— phenyl ring, with two pendant (2-t-$C_4H_9$-5-$CH_3$-phenyl)-O-P< groups |
| 86. | $C_2H_5$ | 4 | $(CH_3)_2C$[—(tetrahydrothiopyran-S)—O—P<]₂ |
| 93. | $C_2H_5$ | 2 | $O=C<$ |
| 96. | $C_2H_5$ | 2 | $(CH_3)_2C$[—(tetrahydrothiopyran-S)—O—$\overset{\|}{\underset{O}{C}}$—]₂ |
| 97. | $CH_3$ | 2 | $-\overset{\|}{\underset{O}{C}}-OCH_2CH_2O-\overset{\|}{\underset{O}{C}}-$ |

E. Miscellaneous

No.

-continued

38. 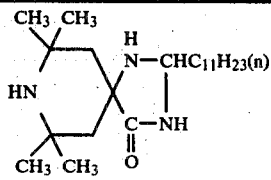

55. 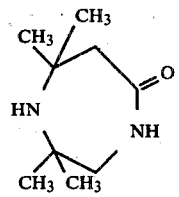

56. 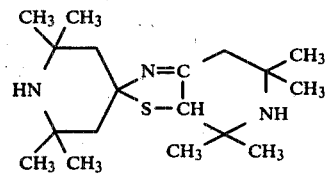

57. 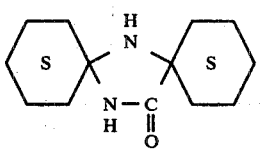

58. 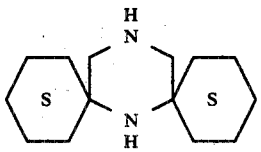

59. 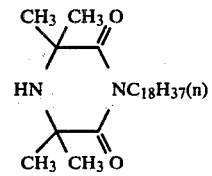

60. 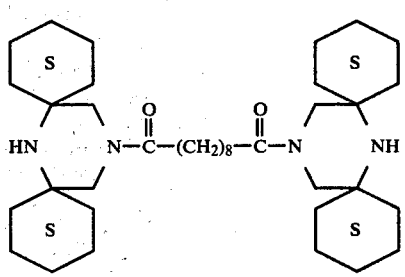

The names of the above-listed compounds falling within Formula I are as follows:
1. 4-Benzoyloxy-2,2,6,6-tetramethyl piperidine
2. 4-Salicyloyloxy-2,2,6,6-tetramethyl piperidine
3. 4-Capryloyloxy-2,2,6,6-tetramethyl piperidine
4. 4-Stearoyloxy-2,2,6,6-tetramethyl piperidine
5. 4-(β-3,5-Di-t-butyl-4-hydroxyphenyl propionyloxy)-2,2,6,6-tetramethyl piperidine
6. 4-(3,5-Di-t-butyl-4-hydroxy benzoyloxy)-2,2,6,6-tetramethyl piperidine
7. 4-Benzoyloxy-1,2,2,6,6-pentamethyl piperidine
8. 4-Salicyloyloxy-1,2,2,6,6-pentamethyl piperidine
9. 4-Stearoyloxy-1,2,2,6,6-pentamethyl piperidine
10. 4-t-Butyl benzoyloxy-1,2,2,6,6-pentamethyl piperidine
11. Bis-(2,2,6,6-tetramethyl-4-piperidinyl)sebacate
12. Bis-(2,2,6,6-tetramethyl-4-piperidinyl)suberate
13. Bis-(2,2,6,6-tetramethyl-4-piperidinyl)decanedicarboxylate
14. Bis-(1,2,6,6-pentamethyl-4-piperidinyl)sebacate
15. 4-Capryloyloxy-1-propyl-2,2,6,6-tetramethyl piperidine 16. 4-Capryloyloxy-1-allyl-2,2,6,6-tetramethyl piperidine
17. 4-Benzoylamino-2,2,6,6-tetramethyl piperidine
18. 4-Acryloylamino-2,2,6,6-tetramethyl piperidine
19. 4-Stearoylamino-2,2,6,6-tetramethyl piperidine
20. N,N'-bis-(2,2,6,6-tetramethyl-4-piperidinyl)oxalamide
21. N-(2,2,6,6-tetramethyl-4-piperidinyl)cyclohexanone-imine
22. (2,2,6,6-Tetramethyl piperidine-4-one)azine
23. 3-n-Butyl-7,7,9,9-tetramethyl-1,3,8-triazaspiro[4,5]decane-2,4-dione
24. 3-n-Butyl-8-methyl-7,7,9,9-tetramethyl-1,3,8-triazaspiro[4,5]decane-2,4-dione
25. 3-n-Octyl-7,7,9,9-tetramethyl-1,3,8-triazaspiro[4,5]decane-2,4-dione
26. 3-n-Octyl-8-methyl-7,7,9,9-tetramethyl-1,3,8-triazaspiro[4,5]decane-2,4-dione
27. 3-Allyl-7,7,9,9-tetramethyl-1,3,8-triazaspiro[4,5]decane 2,4-dione
28. Tetra-(2,2,6,6-tetramethyl-4-piperidinyl)-1,3-bis-(aminomethyl)cyclohexane tetraacetate
29. 3-Glycidyl-7,7,9,9-tetramethyl-1,3,8-triazaspiro[4,5]decane-2,4-dione
30. 3-Glycidyl-8-methyl-7,7,9,9-tetramethyl-1,3,8-triazaspiro[4,5]decane-2,4-dione
31. 3-Octadecyl-7,7,9,9-tetramethyl-1,3,8-triazaspiro[4,5]decane-2,4-dione
32. 3-Cyclohexyl-7,7,9,9-tetramethyl-1,3,8-triazaspiro[4,5]decane-2,4-dione
33. 1,3,8-Trimethyl-7,7,9,9-tetramethyl-1,3,8-triazaspiro[4,5]decane-2,4-dione
34. 1,8-Dimethyl-3-hexamethylene-bis-(7,7,9,9-tetramethyl-1,3,8-triazaspiro[4,5]decane-2,4-dione)
35. 1,8-Dimethyl-3-(3-oxapentamethylene)-bis-(7,7,9,9-tetramethyl-1,3,8-triazaspiro[4,5]decane-2,4-dione)
36. 7,7,8,9,9-Pentamethyl-1,3,8-triazaspiro[4,5]-decane-2,4-dione
37. 3-n-Octyl-8-benzyl-7,7,9,9-tetramethyl-1,3,8-triazaspiro[4,5]decane-2,4-dione
38. 1,3,8-Triaza-2-n-undecyl-4-oxo-7,7,9,9-tetramethyl-spiro[4,5]decane
39. 2,4,6-Tris-(2,2,6,6-tetramethyl-4-piperidinyloxy)-s-triazine
40. 2,4,6-Tris-(1,2,2,6,6-pentamethyl-4-piperidinyloxy)-s-triazine
41. 2,4,6-Tris-(2,2,6,6-tetramethyl-4-piperidinylamino)-s-triazine
42. 2,2,6,6,-Tetramethyl-4-β-cyanomethoxy piperidine
43. 1,2,2,6,6-Pentamethyl-4-lauroyloxy piperidine
44. Triacetone amine-oxime
45. Ethyl-(2,2,6,6-tetramethyl piperidinylidene-4)-acetate
46. Stearyl-(2,2,6,6-tetramethyl piperidinyl-4)-acetate
47. Ethyl-(1,2,2,6,6-pentamethyl piperidinyl-4)-acetate
48. 2,2,6,6-Tetramethyl-4-piperidinyl (2,2,6,6-tetramethyl piperidinyl-4)acetate
49. N,N'-bis-(2,2,6,6-tetramethyl piperidinyl-4-acetyl)ethylenediamine
50. 2,2,6,6-Tetramethyl-4-(β-capryloylaminoethyl)-piperidine
51. N,N'-bis-β-(2,2,6,6-tetramethyl piperidinyl-4)-ethyl oxalamide
52. 2,6-Dimethyl-4-(2,2,6,6-tetramethyl piperidinyl-4)-phenol
53. Bis-(2,2,6,6-tetramethyl piperidinyl-4)adipoyl hydrazone
54. 2,2,6,6-Tetramethyl piperidinyl-4-capryloyl hydrazone
55. 2,2,7,7-Tetramethyl-hexahydro-5H-1,4-diazepin-5-one
56. 5,5,7,7-Tetramethyl piperidino[5,4-0]-Δ³-thiazoline-2-spiro-4-(2,2,6,6-tetramethyl piperidine)
57. Cyclohexane-1-spiro-2'-(4'-oxoimidazoline)-5'-spiro-1''-cyclohexane
58. 7,15-Diazadispiro[5,1,5,3]hexadecane
59. 4-n-Octadecyl-2,2,6,6-tetramethyl-3,5-diketo piperazine
60. 15,15'-Sebacoyl-bis-(7,15-diazadispiro[5,15,3]hexadecane)
61. 1-n-Octyl-2,2,6,6-tetramethyl piperidine
62. 1-n-Dodecyl-2,2,6,6-tetramethyl piperidine
63. 1-β-Stearoyloxyethyl-2,2,6,6-tetramethyl piperidine
64. 1-n-Octoxy carbonylmethyl-2,2,6,6-tetramethyl piperidine
65. 2,2,6,6-Tetramethyl-4-benzoyl piperidine-1-oxyl
66. Bis-(2,2,6,6-tetramethyl-4-piperidinyl-1-oxyl)sebacate
67. Tris-(2,2,6,6-tetramethyl-4-piperidinyl)nitrilo triacetate
68. Tris-(2,2,6,6-tetramethyl-4-piperidinyl)butane tricarboxylate
69. Tetra-(2,2,6,6-tetramethyl-4-piperidinyl)butane tetracarboxylate
70. Tris-(2,2,6,6-tetramethyl-4-piperidinyl)trimellitate
71. Tetra-(2,2,6,6-tetramethyl-4-piperidinyl)pyromellitate
72. Bis-(2,2,6,6-tetramethyl-4-piperidinyl)terephthalate
73. Bis-(9-aza-8,8,10,10-tetramethyl-3-ethyl-1,5-dioxaspiro[5,5]-3-undecylmethyl)methyl iminodiacetate
74. Tris-(2,2,6,6-tetramethyl-4-piperidinyl)citrate
75. Tris-(2,2,6,6-tetramethyl-4-piperidinyl)phosphite
76. Bis-(2,4-di-t-butylphenyl)-2,2,6,6-tetramethyl-4-piperidinyl phosphite
77. Bis-(2,2,6,6-tetramethyl-4-piperidinyl)pentaerythritol diphosphite
78. Bis-(9-aza-8,8,10,10-tetramethyl-3-ethyl-1,5-dioxaspiro[5,5]-3-undecylmethyl).pentaerythritol.diphosphite
79. Tetra-(2,2,6,6-tetramethyl-4-piperidinyl).bisphenol A.diphosphite
80. Tetra-(9-aza-8,8,10,10-tetramethyl-3-methyl-1,5-dioxaspiro[5,5]-3-undecylmethyl).4,4'-butylidene bis-(2-t-butyl-5-methyl phenol).diphosphite
81. Tetra-(2,2,6,6-tetramethyl-4-piperidinyl).1,6-hexane diol.diphosphite
82. Hexa-(9-aza-8,8,10,10-tetramethyl-1,5-dioxaspiro[5,5]-3-undecylmethyl).1,1,3-tris-(2-methyl-4-hydroxy.5-t-butylphenyl)butane.triphosphite.
83. Hexa-(2,2,6,6-tetramethyl-4-piperidinyl).tris-(2-hydroxyethyl)isocyanurate.triphosphite
84. Tetra-(2,2,6,6-tetramethyl-4-piperidinyl).neopentyl glycoldiphosphite
85. Tetra-(2,2,6,6-tetramethyl-4-piperidinyl).hydrogenated bisphenol A.diphosphite
86. Tetra-(9-aza-8,8,10,10-tetramethyl-3-ethyl-1,5-dioxaspiro[5,5]-3-undecylmethyl).hydrogenated A.diphosphite
87. Tris-(2,2,6,6-tetramethyl-4-piperidinyl)phosphate
88. Bis-(9-aza-8,8,10,10-tetramethyl-3-ethyl-1,5-dioxaspiro[5,5]-3-undecylmethyl).pentaerythritol.diphosphite
89. 3,5-Di-t-butyl-4-hydroxybenzyl-bis-(2,2,6,6-tetramethyl-4-piperidinyl)phosphonate 90. Phenyl-bis-(2,2,6,6-tetramethyl-4-piperidinyl)phosphinate
91. Tris-(2,2,6,6-tetramethyl-4-piperidinyl)borate
92. Bis-(2,2,6,6-tetramethyl-4-piperidinyl)dimethyl silicate
93. Bis-(9-aza-8,8,10,10-tetramethyl-3-ethyl-1,5-dioxaspiro[5,5]-3-undecylmethyl)carbonate
94. Bis-(2,2,6,6-tetramethyl-4-piperidinyl)carbonate
95. Bis-(2,2,6,6-tetramethyl-4-piperidinyl).4,4'-butylidene bis-(2-t-butyl-5-methylphenyl).dicarbonate
96. Bis-(9-aza-8,8,10,10-tetramethyl-3-ethyl-1,5-dioxaspiro[5,5]-3-undecylmethyl).hydrogenated bisphenol A.dicarbonate
97. Bis-(9-aza-8,8,10,10-tetramethyl-3-methyl-1,5-dioxaspiro[5,5]-3-undecylmethyl).ethylene glycol.dicarbonate These compounds are for the most part known compounds, and can be prepared by conventional procedures, of which the following are exemplary.

The heterocyclic acid hydrazides of Formula II are also for the most part known compounds, and are readily prepared by conventional procedures. An exemplary procedure is the reaction of the hydrazine $NH_2-NHR$ with a polycarboxylic acid of corresponding structure:

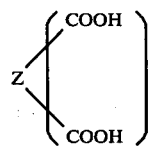

as well as esters and acid chlorides of such polycarboxylic acids.

Exemplary R alkyl groups include any of the groups set forth above for $R_1$.

Exemplary R aryl groups include phenyl, naphthyl, phenanthryl, and anthracenyl, as well as alkaryl including benzyl, xylyl, mesityl, ethyl phenyl, phenethyl, and t-butyl phenyl.

Exemplary R hydroxyalkyl include hydroxymethyl, hydroxyethyl, and hydroxypropyl. Exemplary R ether-, carbonyl-, and ester-containing alkyl and aryl groups include methoxy, carbonylmethyl, butoxy carbonyl ethyl, and 3,5-di-t-butyl-4-hydroxybenzyl.

Exemplary polycarboxylic acids of the type

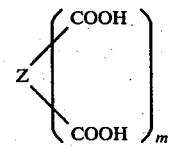

are malonic acid, succinic acid, maleic acid, acetylene dicarboxylic acid, methylmaleic acid, malic acid, tartaric acid, phthalic acid, ethylene tetracarboxylic acid, pyromellitic acid, tetrahydrophthalic acid, and 5-bicyclo[2,2,1]heptene-2,3-di-carboxylic acid, etc.

Typical examples of cyclic acid hydrazide compounds are as follows:

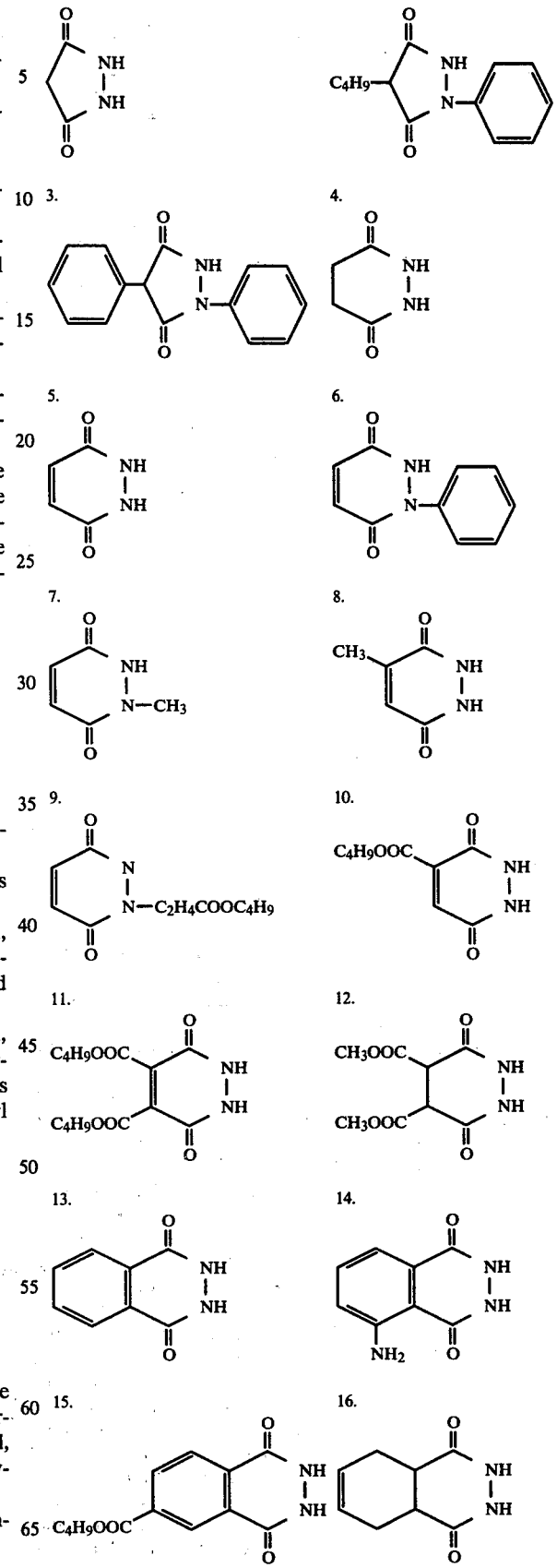

-continued

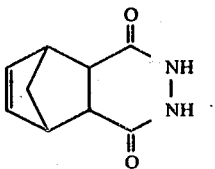
19.

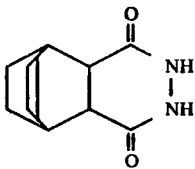
20.

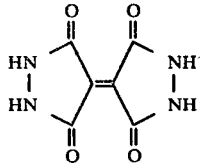
21.

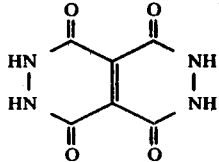
22.

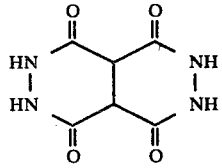
23.

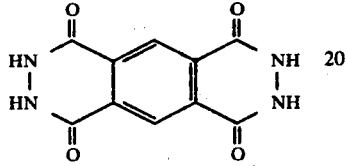

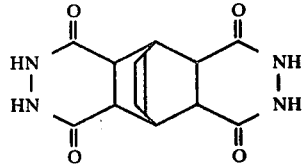
24.

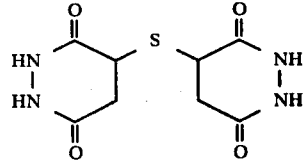

In addition to the light stabilizer combinations of the invention, other conventional stabilizers can be included, such as phenolic antioxidant heat stabilizers, and similar adjuncts.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

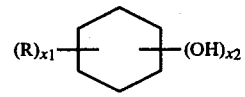

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

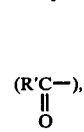

where R' is aryl, alkyl or cycloalkyl.

$x_1$ and $x_2$ are integers from one to four, and the sum of $x_1$ and $x_2$ does not exceed six.

The polycyclic phenol is one having at least two aromatic nuclei linked by a polyvalent linking radical, as defined by the formula:

$$(Ar)_{n1}-Y-(Ar)_{n2}$$
$$(OH)_{m1} \quad (OH)_{m2}$$

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

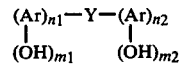

where R' is aryl, alkyl or cycloalkyl, or thiohydrocarbon groups having from one to about thirty carbon atoms, and carboxyl

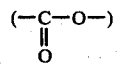

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

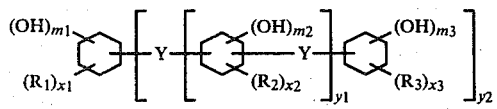

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene arylene, alkyl arylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to subgenera as follows: '(1) Y groups where at least one carbon in a chain or cyclic arrangement connect the aromatic groups, such as:

—CH₂—CH₂—; —(CH₂)₅—; —CH₂—;

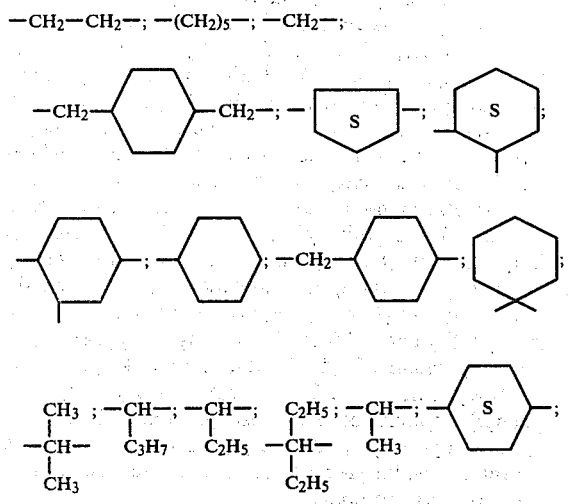

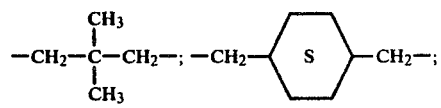

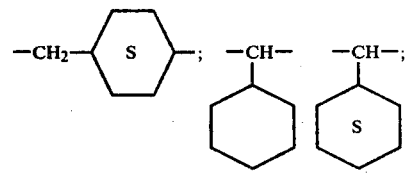

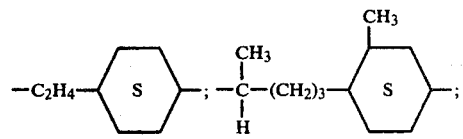

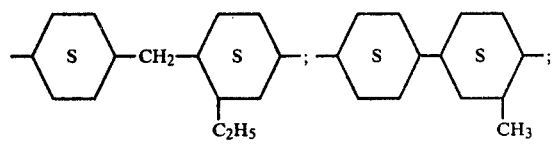

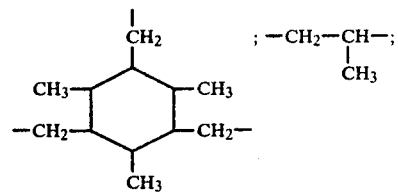

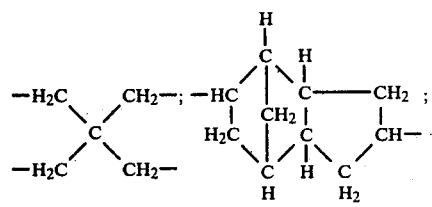

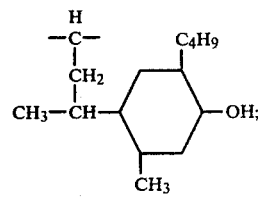

(2) Y groups where only atoms other than carbon link the aromatic rings, such as

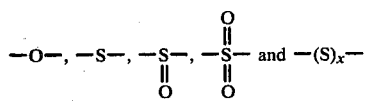

where x is a number from one to ten;

(3) Y groups made up of more than a single atom including both carbon and other atoms linking the aromatic nuclei, such as:

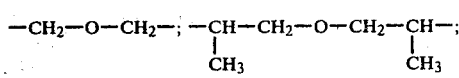

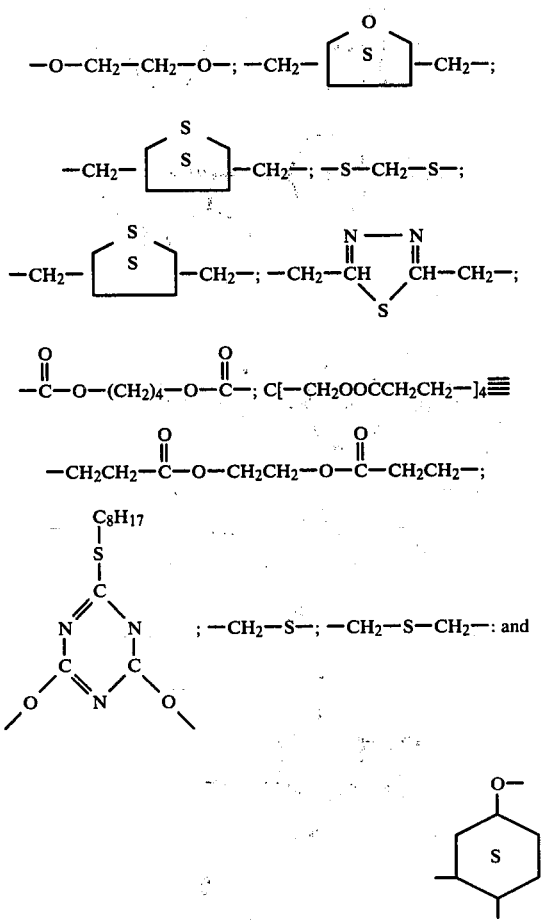

Although the relation of effectivness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o- and m-tert-butyl-p-hydroxy-anisole, p-n-decyloxy-phenol, p-n-decyloxy-cresol, nonyl-n-decyloxy-cresol, eugenol, isoeugenol, glycerol monosalicylate, methyl-p-hydroxycinnamate, 4-benzyloxy-phenol, p-acetylaminophenol, p-stearyl-aminophenol methyl-p-hydroxybenzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl(4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol, 4,4'-benzylidene bis-(2-tertiary-butyl-5-methyl-phenol), 4,4'-cyclohexylidene bis-(2-tertiary-butylphenol), 2,2'-methylene-bis-(4-methyl-6-(1'-methylcyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol, 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol)2,2'-methylene-bis-(4-methyl-6-(1'-methyl-cyclohexyl)phenol), 4,4'cyclohexylene bis-(2-tertiary-butyl-phenol), 2,6-bis-(2'-hydroxy-3'-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'methylene bis-(5-tert-butyl-4-chlorophenol), (3,5-di-tert-butyl-4-hydroxyphenyl)-(4'-hydroxyphenyl)ethane, (2-hydroxy-phenyl)-(3',5'-di-tert-butyl-4',4-hydroxyphenyl)ethane, 2,2'-methylene bis-(4-octylphenol), 4,4'-propylene bis-(2-tert-butylphenol), 2,2'-isobutylene bis-(4-nonylphenol), 2,4-bis-(4-hydroxy-3-t-butylphenoxy)-6-(n-octylthio)-1,3,5-triazine, 2,4,6-tris-(4-hydroxy-3-t-butylphenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol bis-(3-tert-butyl-4-hydroxyphenoxy acetate), 1,4-butanedio bis-(3-tert-butyl-4-hydroxyphenoxy acetate), penta-erythritoltetra (4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methyl-phenyl sulfoxide), bis-(3-ethyl-5-tert-butyl-4-hydroxy benzyl)sulfide, bis-(2-hydroxy-4-methyl-6-tert-butyl phenyl)sulfide, 4,4'-bis-(4-hydroxy-phenol)pentanoic acid octadecyl thiopropionate ester, 1,1,3-tris-(2'-methyl-4-hydroxy-5'-tert-butylphenyl)butane, 1,1,3-tri-(1-methyl-3-hydroxy-4-tert-butylphenyl)butane, 1,8-bis-(2-hydroxy-5-methyl-benzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butyl phenol)-bis-[3,3-bis-(4-hydroxy-3-t-butylphenyl)butyric acid]glycol ester, 4,4'-butylidene bis-(6-t-butyl-m-cresol), 1,1,3-tris-(2-methyl-4-hydroxy-5-,t-butylphenyl)butane, 1,3,5-tris-(3,5-di-t-butyl-4-hydroxybenzyl)-2,4,6-trimethylbenzene, tetrakis[methylene-3(3,5-di-t-butyl-4-hydroxyphenyl)propionate]methane, 1,3,5-tri-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'thiobis(6-t-butyl-m-cresol) and pentaerythritol hydroxyphenyl propionate.

A particularly desirable class of polyhydric polycyclic phenols are the dicyclopentadiene polyphenols, which are of the type:

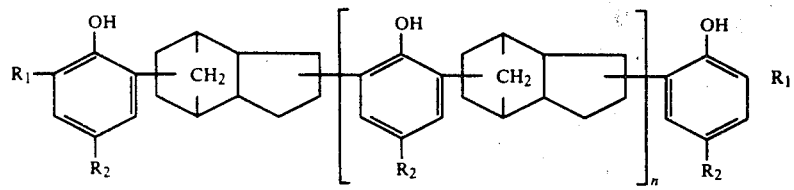

in which

R₁ and R₂ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

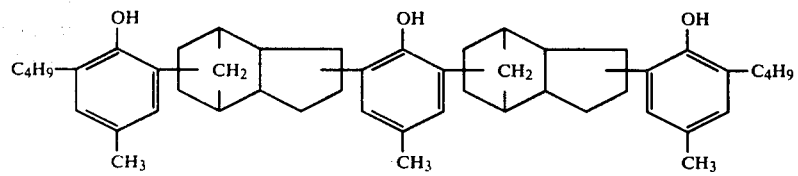

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135 and British Pat. No. 961,504.

In addition, the stabilizer compositions of the invention can include other stabilizers conventionally used as heat and/or light stabilizers for synthetic resins, including thiodipropionic acid esters, polyvalent metal salts of organic acids, organic triphosphites and acid phosphites.

The thiodipropionic acid ester has the following formula:

R₁OOCCH₂CH₂—S—CH₂CH₂COOY in which

R₁ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical R₂, which can be the same as or different from the R₁ radical, (c) a polymeric chain of n thiodipropionic acid ester units:

R₁O[OCCH₂CH₂SCH₂CH₂COOXO]ₙOCCH₂CH₂—S—CH₂CH₂COOZ wherein

Z is hydrogen, R₂ or M;

n is the number of thiodipropionic acid ester units in the chain; and

X is a bivalent hydrocarbon group of the type of R₁;

the value of n can range upwards from 1, but there is no upper limit on n except as is governed by the ratio of carbon atoms to sulfur atoms as stated below; and (d) a polyvalent metal M of Group II of the Periodic Table such as zinc, calcium, cadmium, barium, magnesium, and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) R₁OOCCH₂CH₂SCH₂CH₂COOH (b) R₁OOCCH₂CH₂SCH₂CH₂COOR₂

(c) R₁O[OCCH₂CH₂SCH₂CH₂COOX—O]ₙOCCH₂CH₂SCH₂CH₂COOZ (d) [R₁OOCCH₂CH₂SCH₂CH₂COO]₂M

In the above formulae, R₁ and R₂, M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, R₂ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carboxylic and heterocyclic ring structures condensed therewith.

Typical R radicals, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

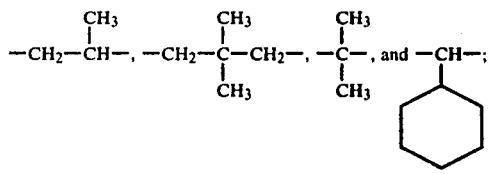

arylene radicals such as phenylene

methylenephenylene

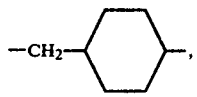

dimethylene phenylene,

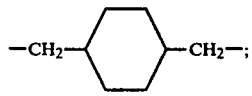

and alicyclene radicals, such as cyclohexylene

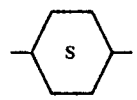

and cyclopentylene

As exemplary of the thiodipropionic acid esters which can be used, there can be mentioned the following: monolauryl thiodipropionic acid, dilauryl thiodipropionate, butyl stearyl thiodipropionate, di-(2-ethylhexyl)-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

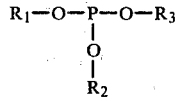

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

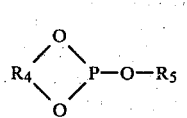

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

$R_5$ is hydrogen or a cation, in the case of the acid phosphites.

Also useful organic triphosphites are mixed heterocyclic-open chain phosphites of the type:

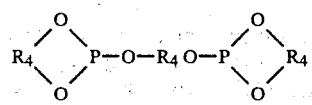

More complex triphosphites are formed from trivalent organic radicals, of the type:

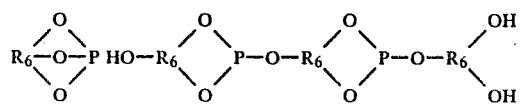

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

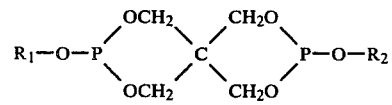

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula:

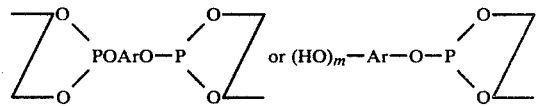

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octylphenyl)phosphite, di(2-ethylhexyl) (isooctylphenyl)phosphite, tri(2-cyclohexylphenyl)phosphite, tri-α-naphthyl phosphite, tri(phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritoldiphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro (5,5)-undecane (where the (polyethoxy)ethyloxy group has an average molecular weight of 350) 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiarybutyl-5-methyl-phenol)) isooctyl phosphite, mono (4,4'-thio-bis(2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis(2-tertiary-butyl-5-methyl-phenol)) di-phenyl phosphite, isooctyl 2,2'-bis(-parahydroxyphenyl) propane phosphite, decyl 4,4'-n-butylidene-bis(2-tertiary-butyl-5-methylphenol) phosphite, tri-4,4'-thiobis(2-tertiary-butyl-5-methylphenol) phosphite, 2-ethylhexyl-2,2'-methylene-bis(4-methyl-6,1'-methylcyclohexyl) phenol phosphite, tri (2,2'-bis-(para-hydroxyphenyl)propane) phosphite, tri (4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetra-tridecyl 4,4'-n-butylidene-bis(2-tertiary butyl-5-methyl phenyl) diphosphite, tetra-isooctyl 4,4'-thiobis (2-tertiary butyl-5-methyl phenyl) diphosphite, 2,2'-methylene-bis(4-methyl 6,1'-methyl cyclohexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methyl-phenyl)diphosphite, tetra-tridecyl-4,4'-iso-propylidene bisphenyl diphosphite, hexa-tridecyl butane-1,1,3-tris (2'-methyl-5'-tertiary-butylphenyl-4'-) triphosphite.

Exemplary acid phosphites are di(phenyl) phosphite, monophenyl phosphite, mono-(diphenyl)phosphite, dicresyl phosphite, di-(o-isooctylphenyl)phosphite, di(p-ethylhexylphenyl)phosphite, di(p-t-octylphenyl)phosphite, di(dimethylphenyl)phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methyl-phenol))-phosphite, (4,4'-thio-bis (2-tertiary-butyl-5-methyl-phenol))phenyl phosphite, bis(4,4'-n-butylidene-bis(2-tertiary-butyl-5-methyl-phenol))phosphite, mono(4,4'-benzylidene-bis(2-tertiary-butyl-5-methyl-phenol))-phosphite, mono(2,2'-bis-(parahydroxyphenyl)-propane)phosphite, mono(4,4'-n-butylidene-bis(-2-tertiary-butyl-5-methyl-phenol)phosphite, bis(4,4'-thiobis(2-tertiary-butyl-5-methylphenol))phosphite, mono-2-ethylhexyl-mono-2,2'methylene-bis(4-methyl-6,1'methylcyclohexyl) phenol phosphite, bis(2,2'-bis-(para-hydroxyphenyl)propane)phosphite, monoisooctyl mono(4,4'thio-bis (2-tertiary-butyl-5-methyl-phenol))-phosphite, isooctyl-(2,6-bis(2'-hydroxy-3,5-dinonylbenzyl)-4-nonyl phenyl))phosphite, tri-tridecyl 4,4'-n-butylidene-bis(2-tertiary-butyl-5-methyl phenyl)diphosphite, triisooctyl 4,4'-thiobis (2-tertiary-butyl-5-methyl phenyl)diphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene bis(2-tertiarybutyl-5-methylphenyl)diphosphite, di-tridecyl-4,4'-isopropylidene bisphenyl diphosphite, tetra-tridecyl butane-1,1,3-tris(2'-methyl-5'-tertiary-butylphenyl-4-)triphosphite.

The hindered heterocyclic amine-heterocyclic acid hydrazide light stabilizer compositions of the invention are effective stabilizers to enhance the resistance to deterioration due to light of synthetic polymeric materials which are susceptible to such degradation.

The stabilizer systems of the invention are especially effective light stabilizers for olefin polymers such as polyethylene, polypropylene, polybutylene, polypentylene, polyisopentylene, and higher polyolefins.

Olefin polymers on exposure to ultraviolet and actinic light undergo degradation, resulting in embrittlement and discoloration.

The stabilizer systems can be employed with any olefin polymer, including low-density polyethylene, high density polyethylene, polyethylenes prepared by the Ziegler-Natta process, polypropylenes prepared by the Ziegler-Natta process, and by other polymerization methods from propylene, poly(butene-1), poly(pentene-1), poly(3-methylbutene-1)poly (4-methylpentene-1), polystyrene, and mixtures of polyethylene and polypropylene with other compatible polymers, such as mixtures of polyethylene and polypropylene, and copolymers of such olefins, such as copolymers of ethylene, propylene, and butene, with each other and with other copolymerizable monomers, which present the instability problem that is resolved by the stabilizer system of the invention. The term "olefin polymer" encompasses both homopolymers and copolymers.

Polypropylene solid polymer can be defined in a manner to differentiate it from other polyolefins as having a density within the range from 0.86 to 0.91, and a melting point above 150° C. The stabilizer system of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer system. Isotactic polypropylene, available commercially under the trade name PRO-FAX, and having a softening or hot-working temperature of about 350° F., is an example of a sterically regular polypropylene polymer.

Mixtures of polypropylene with other compatible polymers and copolymers of propylene with copolymerizable monomers not reactive with the polypropylene stabilizer combination can also be stabilized, for example, mixtures of polyethylene and polypropylene, and copolymers of propylene and ethylene which have a sufficient amount of propylene to present the instability problem that is resolved by the stabilizer combinations of the invention.

The stabilizer combinations are also effective to enhance the resistance to light degradation of polystyrene; polydienes, such as polybutadiene and polyisoprene; and copolymers of olefins and dienes with other ethylenically and acetylenically unsaturated monomers, such as ethylene-vinyl acetate copolymers, styrene-butadiene copolymers, acrylonitrile-styrenebutadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsilon-caprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

A sufficient amount of the stabilizer combination is used to improve the resistance of the synthetic polymer to deterioration in physical properties, including, for example, discoloration, reduction in melt viscosity and embrittlement, under the conditions to which the polymer will be subjected. Very small amounts are usually adequate. Amounts within the range from about 0.001 to about 15% total stabilizers by weight of the polymer are satisfactory. Preferably, from 0.05 to 5% is employed, for optimum stabilization.

Inasmuch as all components are solids, the stabilizer systems of the invention are readily rendered in solid particulate form, comprising a blend of (a) a hindered heterocyclic amine in an amount from about 10 to about 35 parts by weight;

(b) a heterocyclic acid hydrazide in an amount of from about 10 to about 35 parts by weight; and, optionally, (c) a phenolic antioxidant and/or other heat or light stabilizers in an amount of from about 10 to about 35 parts by weight.

The stabilizer compositions of the invention can be employed as the sole stabilizer or in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flameproofing agents, pigments and fillers, can be employed.

Preferably, the stabilizer system is added to the synthetic polymer in an amount to provide in the polymer from about 0.01 to about 5% of the hindered heterocyclic amine, heterocyclic acid hydrazide, and optionally from about 0.001 to about 5% of phenolic antioxidant and/or other heat or light stabilizer.

The stabilizer combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extrusion or injection molding or fiber-forming. In such operations, it will be found to have a considerably improved resistance to reduction in melt viscosity during the heating, as well as a better resistance to discoloration and embrittlement on ageing and heating.

The following Examples illustrate preferred stabilizer systems and resin compositions of the invention.

EXAMPLES 1 TO 16

Polypropylene compositions were prepared using stabilizers of the invention and having the following formulation:

| Ingredient | Parts by Weight |
| --- | --- |
| Polypropylene | 100 |
| Dilaurylthiodipropionate | 0.3 |
| Tetrakis [methylene-3-(3,5-di-t-butyl-4-hydroxyphenyl)propionate] methane | 0.1 |
| Hindered heterocyclic amine as listed in Table I | 0.2 |
| Heterocyclic hydrazide as listed in Table I | 0.1 |

The composition was thoroughly blended in a Brabender Plastograph, and then compression-molded to form sheets 0.5 mm thick.

Pieces 2.5 cm² were cut off from the sheets and exposed to ultraviolet light in a Weather-O-Meter.

In each test, the time in hours required for the sheet to develop a noticeable discoloration and/or embrittlement was noted as the hours to failure.

The results obtained are shown in Table I.

TABLE I

| Example No. | Heterocyclic Amine | Heterocyclic Hydrazide | Hours to Failure |
|---|---|---|---|
| Control 1 | 4-(3,5-Di-t-butyl-4-hydroxy-benzoyloxy)-2,2,6,6-tetramethyl piperidine | None | 480 |
| Control 2 | None | 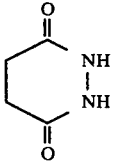 | 190 |
| Control 3 | 2-Hydroxy-4-methoxy-benzophenone (0.3) | None | 360 |
| 1 | 4-Benzoyloxy-2,2,6,6-tetramethyl piperidine | 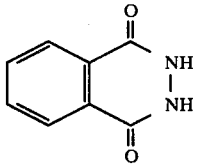 | 950 |
| 2 | 4-(β-3,5-di-t-butyl-4-hydroxyphenyl propionyloxy)-2,2,6,6-tetramethyl piperidine | 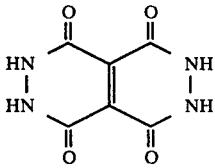 | 980 |
| 3 | 4-(3,5-di-t-butyl-4-hydroxy-benzoyloxy)-2,2,6,6-tetramethyl piperidine | 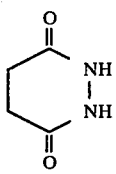 | 1020 |
| 4 | Bis-(2,2,6,6-tetramethyl-4-piperidinyl)sebacate | 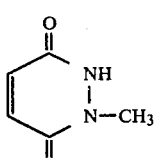 | 1240 |
| 5 | N,N'—bis-(2,2,6,6-tetramethyl-4-piperidinyl)oxalamide | 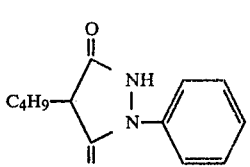 | 930 |
| 6 | Tetra-(2,2,6,6-tetramethyl-4-piperidinyl)-1,3-bis(aminomethyl)cyclohexane tetraacetate | 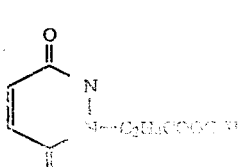 | 1310 |

TABLE I-continued

| Example No. | Heterocyclic Amine | Heterocyclic Hydrazide | Hours to Failure |
|---|---|---|---|
| 7 | N,N'—bis-(2,2,6,6-tetramethyl piperidinyl-4-acetyl) ethylene diamine | (structure: $C_4H_9OOC$-substituted dihydropyridazine-dione with NH-NH) | 960 |
| 8 | Tris-(2,2,6,6-tetramethyl-4-piperidinyl) nitrilotriacetate | (structure: maleic hydrazide – pyridazine-3,6-dione with NH-NH) | 1310 |
| 9 | Tetra-(2,2,6,6-tetramethyl-4-piperidinyl)butane tetracarboxylate | (structure: benzene ring with $C_4H_9OOC$ substituent and fused NH-NH dione) | 1350 |
| 10 | Tris-(2,2,6,6-tetramethyl-4-piperidinyl) citrate | (structure: norbornene fused with NH-NH dione) | 1290 |
| 11 | Bis-(9-aza-8,8,10,10-tetramethyl-3-ethyl-1,5-dioxaspiro [5,5]-3-undecylmethyl).pentaerythritol. diphosphite | (structure: pyridazine-3,6-dione with N-phenyl and NH) | 1080 |
| 12 | Tetra-(9-aza-8,8,10,10-tetramethyl-3-ethyl-1,5-di-oxaspiro [5,5]-3-undecylmethyl).hydrogenated bisphenol A.diphosphite | (structure: $C_4H_9OOC$-substituted dihydropyridazine-dione with NH-NH) | 1100 |
| 13 | 3,5-Di-t-butyl-4-hydroxybenzyl-bis-(2,2,6,6-tetramethyl-4-piperidinyl) phosphonate | (structure: succinic hydrazide – pyrrolidine-2,5-dione with NH-NH) | 1040 |
| 14 | Phenyl-bis-(2,2,6,6-tetramethyl-4-piperidinyl) phosphinate | (structure: benzene with two fused HN-HN dione rings) | 990 |
| 15 | Bis-(2,2,6,6-tetramethyl-4-piperidinyl) carbonate | (structure: bicyclic alkene fused with NH-NH dione) | 960 |

TABLE I-continued

| Example No. | Heterocyclic Amine | Heterocyclic Hydrazide | Hours to Failure |
|---|---|---|---|
| 16 | Bis-(9-aza-8,8,10,10-tetramethyl-3-ethyl-1,5-dioxaspiro [5,5]-3-undecylmethyl).hydrogenated bisphenol A.dicarbonate | 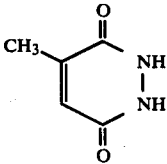 | 1270 |

It is apparent from the above results that the compounds of the invention are superior stabilizers in enhancing the resistance of the polypropylene polymer composition to deterioration in the presence of ultraviolet light. The synergistic effect is shown upon comparison with the Controls using amine and hydrazide alone, in like amounts.

EXAMPLES 17 TO 25

The light stabilizer of this invention shows excellent synergism with known ultraviolet light absorbers. This is illustrated by the following Examples.

Polypropylene compositions of the following formulation were prepared:

| Ingredient | Parts by Weight |
|---|---|
| Polypropylene | 100 |
| 2,2-Methylene bis-(4-ethyl-6-t-butyl)phenol | 0.2 |
| Bis-(2,2,6,6-tetramethyl-4-piperidinyl)sebacate | 0.1 |
| Maleic hydrazide | 0.1 |
| Ultraviolet light stabilizer as listed in Table II | |

The light stability of these sheets was determined by exposure to ultraviolet light in a Weather-O-Meter.

The compositions were thoroughly blended and then injection molded to form sheet 1 mm thick.

Pieces 2.5 cm² were cut off from the sheets and exposed to ultraviolet light in a Weather-O-Meter.

In each test, the time in hours required for the sheet to develop to noticeable discoloration and/or embrittlement was noted as the hours to failure.

The results obtained are shown in Table II.

TABLE II

| Example No. | Ultraviolet Light Stabilizer | Hours to Failure |
|---|---|---|
| Control | None | 830 |
| 17 | 2-Hydroxy-4-methoxy benzophenone | 1160 |
| 18 | 2,2'-Di-hydroxy benzophenone | 980 |
| 19 | 2,4-Di-hydroxy benzophenone | 1070 |
| 20 | 2-Hydroxy-4-octoxy benzophenone | 1050 |
| 21 | Phenylsalicylate | 1010 |
| 22 | 2,4-Di-t-butylphenyl-3,5-di-t-butyl-4-hydroxy benzoate | 1130 |
| 23 | 2-(2'-Hydroxy-3'-t-butyl-5'-methyl phenyl)5-chlorobenzotriazole | 1220 |
| 24 | 2-(2'-Hydroxy-5'-methylphenyl) benzotriazole | 1280 |
| 25 | 2-(2'-Hydroxy-3',5'-di-t-butylphenyl) benzotriazole | 1250 |

It is apparent from the above data that the compositions of the invention are good synergists for conventional ultraviolet light stabilizers.

EXAMPLES 26 TO 36

Polypropylene compositions of the following formulation were prepared:

| Ingredient | Parts by Weight |
|---|---|
| Polypropylene | 100 |
| Stearyl-3-(3',5'-di-t-butyl-4-hydroxyphenyl) propionate | 0.2 |
| Heterocyclic amine as listed in Table III | 0.3 |
| Heterocyclic hydrazide as listed in Table III | 0.3 |

The light stability of these sheets was determined by exposure to ultraviolet light in a Weather-O-Meter.

The compositions were thoroughly blended and then compression molded to form sheets 0.5 mm thick.

Pieces 2.5 cm² were cut off from the sheets and exposed to ultraviolet light in a Weather-O-Meter.

In each test the time in hours required for the sheet to develop to noticeable discoloration and/or embrittlement was noted as the hours to failure.

The results obtained are shown in Table III.

TABLE III

| Example No. | Heterocyclic Amine | Heterocyclic Hydrazide | Hours to Failure |
|---|---|---|---|
| Control 1 | Bis-(2,2,6,6-tetramethyl-4-piperidinyl-1-oxyl) sebacate | None | 560 |
| Control 2 | Tris-(2,2,6,6-tetramethyl-4-piperidinyl) phosphite | None | 620 |
| Control 3 | None | 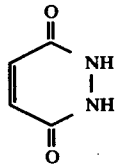 | 280 |

TABLE III-continued

| Example No. | Heterocyclic Amine | Heterocyclic Hydrazide | Hours to Failure |
|---|---|---|---|
| Control 4 | None | 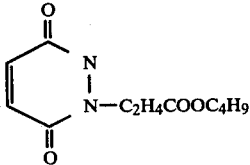 | 160 |
| 26 | Bis-(2,2,6,6-tetramethyl-4-piperidinyl) sebacate | 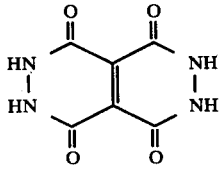 | 1650 |
| 27 | 4-Benzoylamino-2,2,6,6-tetramethyl piperidine | 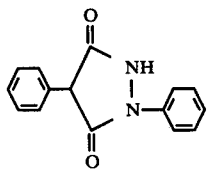 | 1270 |
| 28 | 3-n-Octyl-7,7,9,9-tetramethyl-1,3,8-triazaspiro[4,5]decane-2,4-dione | 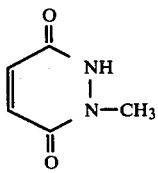 | 1410 |
| 29 | 2,2,6,6-Tetramethyl piperidinyl-4-capryloyl hydrazone | 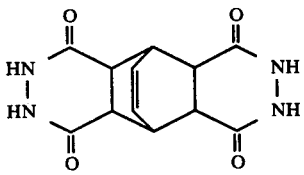 | 1230 |
| 30 | 4-n-Octadecyl-2,2,6,6-tetramethyl-3,5-diketo piperazine | 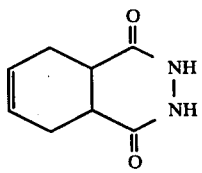 | 1160 |
| 31 | Bis-(2,2,6,6-tetramethyl-4-piperidinyl-1-oxyl) sebacate | 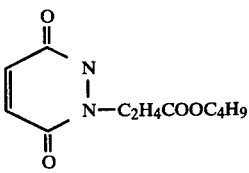 | 1330 |
| 32 | Tetra-(2,2,6,6-tetramethyl-4-piperidinyl) butane tetracarboxylate | 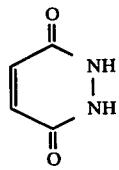 | 1700 |
| 33 | Tris-(2,2,6,6-tetramethyl-4-piperidinyl) trimellitate | 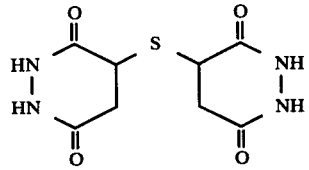 | 1140 |

TABLE III-continued

| Example No. | Heterocyclic Amine | Heterocyclic Hydrazide | Hours to Failure |
|---|---|---|---|
| 34 | Tris-(2,2,6,6-tetramethyl-4-piperidinyl) phosphite | (3-aminophthalic dihydrazide structure) | 1480 |
| 35 | Bis-(9-aza-8,8,10,10-tetramethyl-3-ethyl-1,5-dioxaspiro[5,5]-3-undecylmethyl).pentaerythritol.diphosphite | (bis-hydrazide structure) | 1350 |
| 36 | Bis-(9-aza-8,8,10,10-tetramethyl-3-ethyl-1,5-dioxaspiro[5,5]-3-undecylmethyl).hydrogenated bisphenol A.dicarbonate | (phthalic dihydrazide structure) | 1670 |

It is apparent from the above results that the compounds of the invention are superior stabilizers in enhancing the resistance of the polypropylene polymer composition to deterioration in the presence of ultraviolet light. The synergistic effect is shown upon comparison with the Controls using amine and hydrazide alone, in like amounts.

EXAMPLES 37 TO 46

High density polyethylene compositions were prepared using stabilizers of the invention, and having the following formulation:

| Ingredient | Parts by Weight |
|---|---|
| High-density polyethylene | 100 |
| Ca stearate | 0.1 |
| Distearyl thiodipropionate | 0.2 |
| Tris-(3,5-di-t-butyl-4-hydroxybenzyl)isocyanurate | 0.1 |
| Heterocyclic amine as listed in Table IV | 0.15 |
| Heterocyclic hydrazide as listed in Table IV | 0.2 |

The stabilizer was blended with the polymer on a two-roll mill and sheets 0.5 mm thick were prepared by compression molding of the blend.

Pieces 2.5 cm² were cut off from the sheets, and exposed to ultraviolet light in a Weather-O-Meter.

The time in hours when degradation set in, as determined by a significant discoloration and/or embrittlement, was noted as hours to failure, and the results are reported in Table IV:

TABLE IV

| Example No. | Heterocyclic Amine | Heterocyclic Hydrazide | Hours to Failure |
|---|---|---|---|
| Control 1 | None | None | 320 |
| Control 2 | 4-(β-3,5-Di-t-butyl-4-hydroxyphenyl propionyloxy)-2,2,6,6-tetramethyl piperidine | None | 480 |
| Control 3 | 4-Stearoylamino-2,2,6,6-tetramethyl piperidine | None | 630 |
| Control 4 | None | (norbornene dicarboxylic dihydrazide structure) | 330 |
| 37 | 4-Benzoyloxy-2,2,6,6-tetramethyl piperidine | (cyclohexene dicarboxylic dihydrazide structure) | 1250 |

TABLE IV-continued

| Example No. | Heterocyclic Amine | Heterocyclic Hydrazide | Hours to Failure |
|---|---|---|---|
| 38 | 4-(β-3,5-Di-t-butyl-4-hydroxy phenyl propionyloxy)-2,2,6,6-tetramethyl piperidine | 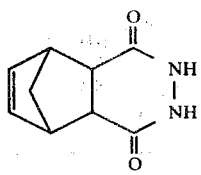 | 1220 |
| 39 | Bis-(1,2,6,6-pentamethyl-4-piperidinyl) sebacate | 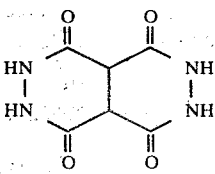 | 1160 |
| 40 | 4-Stearoylamino-2,2,6,6-tetramethyl piperidine | 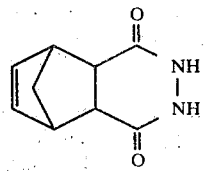 | 1270 |
| 41 | Tris-(2,2,6,6-tetramethyl-4-piperidinyl) nitrilotriacetate | 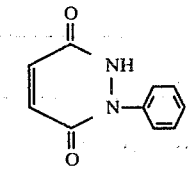 | 1290 |
| 42 | Tetra-(2,2,6,6-tetramethyl-4-piperidinyl) butane tetracarboxylate | 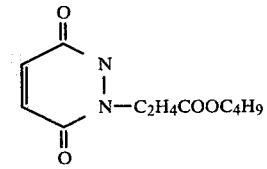 | 1340 |
| 43 | Tris-(2,2,6,6-tetramethyl-4-piperidinyl) citrate | 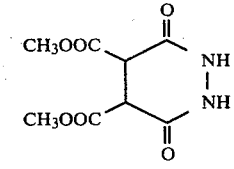 | 1250 |
| 44 | Tetra-(9-aza-8,8,10,10-tetramethyl-3-ethyl-1,5-di-oxaspiro[5,5]-3-undecylmethyl).hydrogenated bisphenol A.diphosphite | 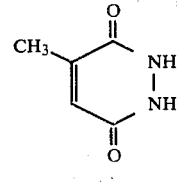 | 1200 |
| 45 | 3,5-Di-t-butyl-4-hydroxybenzyl-bis-(2,2,6,6-tetramethyl-4-piperidinyl) phosphonate | 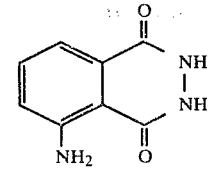 | 1180 |

TABLE IV-continued

| Example No. | Heterocyclic Amine | Heterocyclic Hydrazide | Hours to Failure |
|---|---|---|---|
| 46 | Bis-(9-aza-8,8,10,10-tetramethyl-3-ethyl-1,5-dioxaspiro[5,5]-3-undecylmethyl).hydrogenated bisphenol A.dicarbonate | 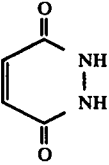 | 1310 |

It is apparent from the above results that the compounds of the invention are superior stabilizers in enhancing the resistance of the polyethylene polymer composition to deterioration in the presence of ultraviolet light. The synergistic effect is shown upon comparison with the Controls using amine and hydrazide alone, in like amounts.

EXAMPLES 47 TO 53

Ethylene-vinyl acetate copolymer compositions were prepared using stabilizers of the invention and having the following formulation:

| Ingredient | Parts by Weight |
|---|---|
| Ethylene-vinyl acetate copolymer | 100 |
| Montan wax lubricant | 0.3 |

-continued

| Ingredient | Parts by Weight |
|---|---|
| 2,6-Di-t-butyl-p-cresol | 0.1 |
| Heterocyclic amine as listed in Table V | 0.25 |
| Heterocyclic hydrazide as listed in Table V | 0.05 |

The stabilizer was blended with the polymer on a two-roll mill at 120° C., and sheets 1 mm thick were then compression molded at 120° C. from the resulting blend.

Pieces 2.5 cm² were cut off from the sheets and exposed to ultraviolet light in a Weather-O-Meter for 500 hours. At the start and at the conclusion of the test, the tensile strength of the sheet samples was determined. The results are given in Table V as % retention of the initially determined tensile strength.

TABLE V

| Example No. | Heterocyclic Amine | Heterocyclic Hydrazide | Percent Tensile Strength Retained |
|---|---|---|---|
| Control 1 | None | None | 49 |
| Control 2 | 4-(3,5-Di-t-butyl-4-hydroxy benzoyloxy)-2,2,6,6-tetramethyl piperidine | None | 65 |
| Control 3 | None | 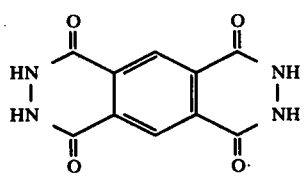 | 51 |
| 47 | 4-(3,5-Di-t-butyl-4-hydroxy benzoyloxy)-2,2,6,6-tetramethyl piperidine | 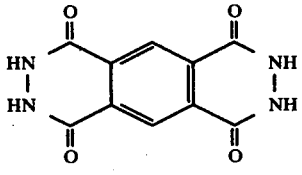 | 85 |
| 48 | Bis-(2,2,6,6-tetramethyl-4-piperidinyl) sebacate | 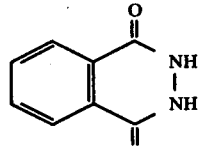 | 88 |
| 49 | Tetra-(2,2,6,6-tetramethyl-4-piperidinyl)-1,3-bis-(aminomethyl) cyclohexane tetraacetate | 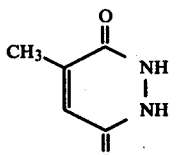 | 90 |

TABLE V-continued

| Example No. | Heterocyclic Amine | Heterocyclic Hydrazide | Percent Tensile Strength Retained |
|---|---|---|---|
| 50 | Tris-(2,2,6,6-tetramethyl-4-piperidinyl) nitrilotriacetate | 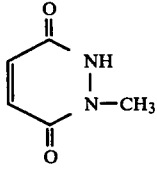 | 91 |
| 51 | Bis-(9-aza-8,8,10,10-tetramethyl-3-ethyl-1,5-dioxaspiro[5,5]-3 undecylmethyl).pentaerythritol. diphosphite | 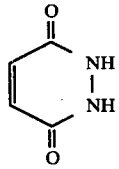 | 86 |
| 52 | Bis-(2,2,6,6-tetramethyl-4-piperidinyl) carbonate | 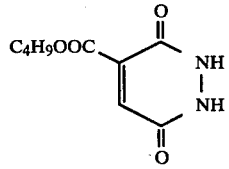 | 85 |
| 53 | Bis-(9-aza-8,8,10,10-tetra-methyl-3-ethyl-1,5-dioxaspiro [5,5]-3-undecylmethyl). hydrogenated bisphenol A. dicarbonate | 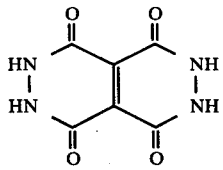 | 89 |

It is apparent from the results that the stabilizer compositions in accordance with the invention are superior in enhancing the resistance of the ethylene-vinyl acetate copolymer to deterioration in the presence of ultraviolet light, and at elevated temperature. The synergistic effect is evident from comparison of Example 47 with the Controls 2 and 3 using amine and hydrazide alone in like amounts.

EXAMPLES 54 TO 59

A group of polyvinyl chloride resin compositions was prepared having the following formulation:

| Ingredient | Parts by Weight |
|---|---|
| Polyvinyl chloride | 100 |
| Dioctylphthalate | 50 |

-continued

| Ingredient | Parts by Weight |
|---|---|
| Ca stearate | 1.0 |
| Zn stearate | 0.1 |
| Heterocyclic amine as listed in Table VI | 0.2 |
| Heterocyclic hydrazide as listed in Table VI | 0.5 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light (denoted as Hours to Failure in Table VI).

The results obtained are given in Table VI:

TABLE VI

| Example No. | Heterocyclic Amine | Heterocyclic Hydrazide | Hours to Failure |
|---|---|---|---|
| Control 1 | None | None | 250 |
| Control 2 | N,N'—bis-(2,2,6,6-tetramethyl-4-piperidinyl)oxalamide | None | 390 |
| 54 | 4-(β-3,5-Di-t-butyl-4-hydroxy phenyl propionyloxy)-2,2,6,6-tetramethyl piperidine | 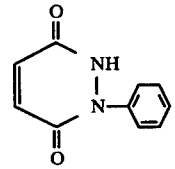 | 890 |

TABLE VI-continued

| Example No. | Heterocyclic Amine | Heterocyclic Hydrazide | Hours to Failure |
|---|---|---|---|
| 55 | N—N'—4-piperidinyl)oxalamide | 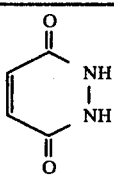 | 880 |
| 56 | Tetra-(2,2,6,6-tetramethyl-4-piperidinyl)butane tetracarboxylate | 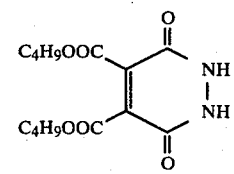 | 940 |
| 57 | Bis-(9-aza-8,8,10,10-tetramethyl-3-ethyl-1,5-dioxaspiro [5,5]-3-undecylmethyl).pentaerythritol. diphosphite | 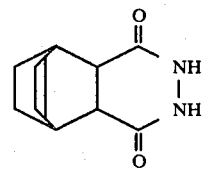 | 960 |
| 58 | Tetra-(9-aza-8,8,10,10-tetramethyl-3-ethyl-1,5-dioxaspiro[5,5]-3-undecylmethyl).hydrogenated bisphenol A.diphosphite | 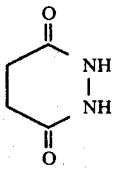 | 910 |
| 59 | Bis-(2,2,6,6-tetramethyl-4-piperidinyl) carbonate | 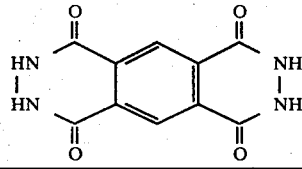 | 830 |

It is apparent from the Controls using amine and hydrazide alone in like amounts that the stabilizer compositions in accordance with the invention are far superior and display a synergistic effect.

EXAMPLES 60 TO 66

Acrylonitrile-butadiene-styrene terpolymer resin compositions were prepared using stabilizer compositions of the invention and having the following formulation:

| Ingredient | Parts by Weight |
|---|---|
| Acrylonitrile-butadiene-styrene terpolymer | 100 |
| Calcium stearate | 0.5 |
| 1,1,3-Tris-(2-methyl-4-hydroxy-5-t-butylphenyl) butane | 0.1 |
| Heterocyclic amine as listed in Table VII | 0.4 |
| Heterocyclic hydrazide as listed in Table VII | 0.2 |

The stabilizers were blended with the resin on a two-roll mill, and sheets 2.5 mm thick were prepared by compression molding of the resulting blend.

Pieces 2.5 cm² were cut off from the sheets, and subjected to ultraviolet light in a Weather-O-Meter for 800 hours. Tensile strength before and after the test exposure was determined, and the results reported as the percent of tensile strength retained, at the end of this time, in Table VII.

TABLE VII

| Example No. | Heterocyclic Amine | Heterocyclic Hydrazide | Percent Tensile Strength Retained |
|---|---|---|---|
| Control 1 | None | None | 40 |
| Control 2 | Bis-(2,2,6,6-tetramethyl-4-piperdinyl)carbonate | None | 53 |
| 60 | 4-Benzoyloxy-2,2,6,6-tetramethyl piperidine | 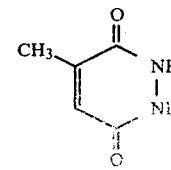 | 79 |

TABLE VII-continued

| Example No. | Heterocyclic Amine | Heterocyclic Hydrazide | Percent Tensile Strength Retained |
|---|---|---|---|
| 61 | Bis-(2,2,6,6-tetramethyl-4-piperdinyl)sebacate | [structure: phthalic hydrazide with C4H9OOC substituent] | 85 |
| 62 | Tetra-(2,2,6,6-tetramethyl-4-piperidinyl)-1,3-bis-(aminomethyl) cyclohexane tetraacetate | [structure: benzene tetracarboxylic tetrahydrazide] | 85 |
| 63 | Tetra-(2,2,6,6-tetramethyl-4-piperidinyl)butane tetracarboxylate | [structure: N-phenyl pyridazinedione] | 87 |
| 64 | Tris-(2,2,6,6-tetramethyl-4-piperidinyl)phosphite | [structure: phthalic hydrazide] | 80 |
| 65 | Phenyl-bis-(2,2,6,6-tetramethyl-4-piperidinyl)phosphite | [structure: ethylene tetracarboxylic tetrahydrazide] | 82 |
| 66 | Bis-(2,2,6,6-tetramethyl-4-piperdinyl)carbonate | [structure: N-(C2H4COOC4H9) pyridazinedione] | 83 |

It is apparent from the data that the combination of amine and hydrazide is superior to either alone in like amount, showing the synergistic effect of the combination.

EXAMPLES 67 TO 72

Polyamide resin compositions were prepared using stabilizers of the invention and having the following formulation:

| Ingredient | Parts by Weight |
|---|---|
| Poly-epsilon-caprolactam | 100 |
| Heterocyclic amine as shown in Table VIII | 0.2 |
| Heterocyclic hydrazide as shown in Table VIII | 0.1 |

The stabilizer was blended with the finely powdered poly-epsilon-caprolactam in a ball mill for fifteen minutes, and the resulting powder was then compression molded at 250° C. to form sheets 0.5 mm thick.

Pieces 2.5 cm² were cut out from the sheets, and exposed to ultraviolet light in a Weather-O-Meter for 120 hours. At the conclusion of the test period, the color of the sheets was noted.

The results obtained are given in Table VIII.

TABLE VIII

| Example No. | Heterocyclic Amine | Heterocyclic Hydrazide | Color of Sheets |
|---|---|---|---|
| Control 1 | None | None | Dark brown |
| Control 2 | 4-Benzoylamino-2,2,6,6-tetramethyl piperidine | None | Yellow |

TABLE VIII-continued

| Example No. | Heterocyclic Amine | Heterocyclic Hydrazide | Color of Sheets |
|---|---|---|---|
| 67 | Bis-(2,2,6,6-tetramethyl-4-piperidinyl)sebacate | (succinohydrazide structure) | Colorless |
| 68 | 4-Benzoylamino-2,2,6,6-tetramethyl piperidine | (benzene-1,2,4,5-tetracarboxylic tetrahydrazide structure) | Colorless |
| 69 | 3-n-Octyl-7,7,9,9-tetramethyl-1,3,8-triazaspiro[4,5]decane-2,4-dione | (C$_4$H$_9$OOC-substituted cyclic hydrazide structure) | Colorless |
| 70 | 2,2,6,6-Tetramethyl piperidinyl-4-capryloylhydrazone | (C$_4$H$_9$OOC-substituted phthalohydrazide structure) | Pale yellow |
| 71 | Tris-(2,2,6,6-tetramethyl-4-piperidinyl)nitrilotriacetate | (tetrahydrophthalohydrazide structure) | Colorless |
| 72 | Bis-(9-aza-8,8,10,10-tetramethyl-3-ethyl-1,5-dioxaspiro[5,5]-3-undecylmethyl).pentaerythritol. diphosphite | (CH$_3$-substituted cyclic hydrazide structure) | Colorless |

The synergistic effect of the combination is apparent from comparison with the Controls using the amine and hydrazide alone in like amounts.

EXAMPLES 73 TO 78

Polybutylene terephthalate resin compositions were prepared having the following compositions:

| Ingredient | Parts by Weight |
|---|---|
| Polybutylene terephthalate | 100 |
| Tris nonylphenyl phosphite | 0.1 |
| Heterocyclic amine as listed in Table IX | 0.3 |
| Heterocyclic hydrazide as listed in Table IX | 0.2 |

The compositions were extruded to form pellets, and then test pieces were molded from the pellets by injection molding at 270° C. Test pieces were irradiated with ultraviolet light for 500 hours in a Weather-O-Meter. Tensile strength before and after the test was determined, and the percent tensile strength retained in each test is given in Table IX.

TABLE IX

| Example No. | Heterocyclic Amine | Heterocyclic Hydrazide | Percent Tensile Strength Retained |
|---|---|---|---|
| Control 1 | None | None | 47 |
| Control 2 | 4-Benzoyloxy-2,2,6,6-tetramethyl piperidine | None | 54 |
| Control 3 | 3,5-Di-t-butyl-4-hydroxybenzyl- | None | 63 |

TABLE IX-continued

| Example No. | Heterocyclic Amine | Heterocyclic Hydrazide | Percent Tensile Strength Retained |
|---|---|---|---|
| 73 | bis-(2,2,6,6-tetramethyl-4-piperidinyl) phosphonate 4-Benzoyloxy-2,2,6,6-tetramethyl piperidine | maleic hydrazide N-methyl derivative | 83 |
| 74 | Bis-(2,2,6,6-tetramethyl-4-piperidinyl) sebacate | maleic hydrazide N—C$_2$H$_4$COOC$_4$H$_9$ derivative | 85 |
| 75 | Tris-(2,2,6,6-tetramethyl-4-piperidinyl) nitrilotriacetate | 3-amino phthalhydrazide | 86 |
| 76 | Tetra-(2,2,6,6-tetramethyl-4-piperidinyl) butane tetracarboxylate | phthalhydrazide | 87 |
| 77 | 3,5-Di-t-butyl-4-hydroxybenzyl-bis-(2,2,6,6-tetramethyl-4-piperidinyl) phosphonate | maleic hydrazide | 86 |
| 78 | Bis-(9-aza-8,8,10,10-tetramethyl-3-ethyl-1,5-dioxaspiro[5,5]-3-undecylmethyl).hydrogenated bisphenol A.dicarbonate | C$_4$H$_9$OOC-substituted maleic hydrazide | 85 |

It is apparent that the stabilizers of the invention are effective ultraviolet light and heat stabilizers for polyester resins. The synergistic effect is shown by comparison with the controls, using the amine and hydrazide alone in like amounts.

Having regard to the foregoing disclosure, the following is claimed as inventive and patentable embodiments thereof:

1. A light stabilizer composition for organic polymeric materials comprising:
   (1) at least one hindered heterocyclic amine having the formula:

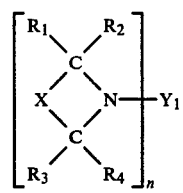

wherein:

X is a bivalent linking radical including at least one up to four ring carbon atoms completing the ring structure:

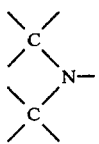

as a heterocyclic ring having from five to seven ring atoms of which at least one is nitrogen and from three to six are carbon; and a substituent selected from the group consisting of Z; O—Z; NH—Z;

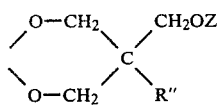

wherein Z is the residue of an acid selected from the group consisting of carboxylic acids having from one to thirty carbon atoms, carbonic acid and inorganic oxyacids of phosphorus, silicon and boron and R″ is hydrogen or lower alkyl; and $=Z_4$ wherein $Z_4$ is a bivalent group selected from the group consisting of:

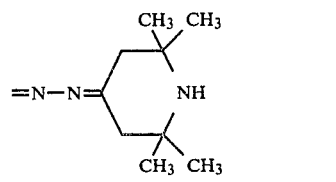

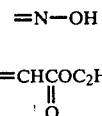

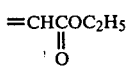

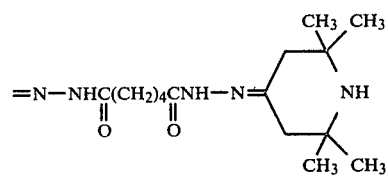

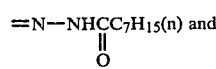

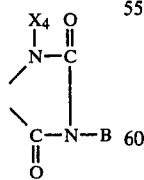

wherein
$X_4$ is hydrogen or methyl; and
B is selected from the group consisting of alkyl, epoxy alkyl, alkenyl and cycloalkyl having from one to about eighteen carbon atoms, and

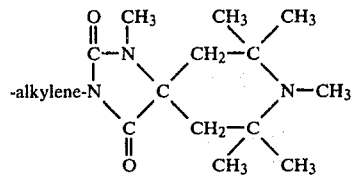

in which the alkylene has from one to about ten carbon atoms;

$R_1$ and $R_2$ are each selected from the group consisting of lower alkyl and $R_1$ and $R_2$ taken together as pentylene $(CH_2)_5$;

$R_3$ and $R_4$ are each selected from the group consisting of lower alkyl, and $R_3$ and $R_4$ taken together as one of butylene—$(CH_2)_4$, pentylene—$(CH_2)_5$, and $CH_2$—$C(CH_3)_2$—NH—$C(CH_3)_2$—$CH_2$—;

n is 1 or 2; and when n is 1, $Y_1$ is selected from the group consisting of hydrogen; O•, OH, alkyl, alkenyl, alkynyl, aralkyl and acyl having from one to about thirty carbon atoms; and when n is 2, $Y_1$ is selected from the group consisting of alkylene, alkenylene, alkynylene, cycloalkylene and aralkylene having from one to about thirty carbon atoms; and (2) at least one heterocyclic acid hydrazide having the formula:

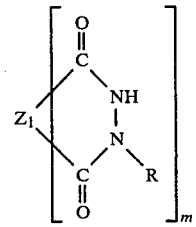

wherein:
R is selected from the group consisting of hydrogen, alkyl, aryl and such groups having hydroxyl, carboxylic acid ester, oxyether and carbonyl groups having from one to about thirty carbon atoms;

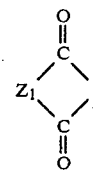

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing t̶h̶e̶ ̶s̶t̶a̶b̶i̶l̶i̶t̶y̶ ̶o̶f̶ ̶t̶h̶e̶ hindered heterocy̶c̶l̶i̶c̶.

2. A light st̶a̶b̶i̶l̶i̶z̶e̶r̶

(1) at least one hindered heterocyclic amine which is a 2,2,6,6-tetrasubsituted piperidine having one of the formulae:

$$\left\{ \begin{array}{c} R_1 \diagdown \underset{\diagup}{\overset{R_2}{\diagdown}} R_6 \\ Y_2-N \qquad A-O \\ R_3 \diagup \underset{\diagdown}{\overset{R_4}{\diagup}} R_5 \end{array} \right\}_{n_1} Z_2 \text{ and}$$

$$\left\{ \begin{array}{c} R_1 \diagdown \underset{\diagup}{\overset{R_2}{\diagdown}} R_6 \\ Y_2-N \qquad A-NH \\ R_3 \diagup \underset{\diagdown}{\overset{R_4}{\diagup}} R_5 \end{array} \right\}_{n_1} Z_2$$

wherein:

$R_1$ and $R_2$ are each selected from the group consisting of lower alkyl, and $R_1$ and $R_2$ taken together as pentylene $(CH_2)_5$;

$R_3$ and $R_4$ are each selected from the group consisting of lower alkyl and $R_3$ and $R_4$ taken together or as one of butylene—$(CH_2)_4$, pentylene—$(CH_2)_5$, and —$CH_2$—$C(CH_3)_2$—NH—$C(CH_3)_2$—$CH_2$—;

$R_5$ and $R_6$ are selected from the group consisting of hydrogen and lower alkyl;

A is $$\diagdown CH- \quad \text{or} \quad \diagdown \underset{\diagup}{\overset{R_7}{C}}_{CH_2}$$

wherein $R_7$ is lower alkyl;

$n_1$ is a number from 1 to 6;

$Y_2$ is selected from the group consisting of hydrogen, $O^\bullet$, OH, alkyl, alkenyl, alkynyl, aralkyl and acryl having from one to about thirty carbon atoms; and $Z_2$ is the residue of an acid selected from the group consisting of carboxylic acids having from one to about thirty carbon atoms, and inorganic oxyacids of phosphorus, silicon and boron; together with (2) at least one heterocyclic acid hydrazide having the formula:

$$\left[ \begin{array}{c} \overset{O}{\underset{\parallel}{C}} \\ Z_1 \diagup \quad \diagdown NH \\ \diagdown \quad \diagup N \\ \underset{\parallel}{C} \diagdown R \\ O \end{array} \right]_m$$

wherein:

R is selected from the group consisting of hydrogen, alkyl, aryl and such groups having hydroxyl, carboxylic acid ester, oxyether and carbonyl groups having from one to about thirty carbon atoms;

$$\begin{array}{c} O \\ \parallel \\ C \\ Z_1 \diagup \quad \diagdown \\ \diagdown \quad \diagup \\ C \\ \parallel \\ O \end{array}$$

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

3. A light stabilizer composition (1) comprising at least one hindered heterocyclic amine having the formula:

$$\begin{array}{c} CH_3 \diagdown \quad \diagup CH_3 \\ C-CH_2 \\ Y_3-N \qquad CH-Z_3 \\ C-CH_2 \\ CH_3 \diagup \quad \diagdown CH_3 \end{array}$$

in which $Y_3$ is selected from the group consisting of hydrogen, $O^\bullet$, OH, alkyl, alkenyl, alkynyl, aralkyl and acyl having from one to about thirty carbon atoms; and $Z_3$ is the residue of a carboxylic acid having from one to about thirty carbon atoms or an inorganic oxyacid of phosphorus, silicon, or boron; together with (2) at least one heterocyclic acid hydrazide having the formula:

$$\left[ \begin{array}{c} \overset{O}{\underset{\parallel}{C}} \\ Z_1 \diagup \quad \diagdown NH \\ \diagdown \quad \diagup N \\ \underset{\parallel}{C} \diagdown R \\ O \end{array} \right]_m$$

wherein:

R is selected from the group consisting of hydrogen, alkyl, aryl and such groups having hydroxyl, carboxylic acid ester, oxyether and carbonyl groups having from one to about thirty carbon atoms;

$$\begin{array}{c} O \\ \parallel \\ C \\ Z_1 \diagup \quad \diagdown \\ \diagdown \quad \diagup \\ C \\ \parallel \\ O \end{array}$$

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

4. A light stabilizer composition comprising
(1) at least one hindered heterocyclic amine having the formula:

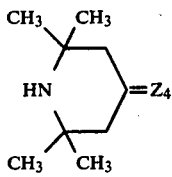

wherein
$Z_4$ is a bivalent group selected from the group consisting of

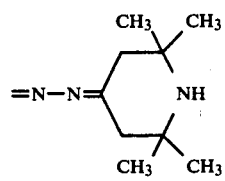

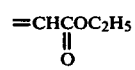

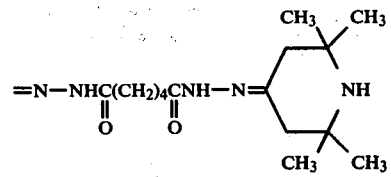

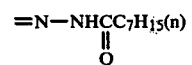

together with
(2) at least one heterocyclic acid hydrazide having the formula:

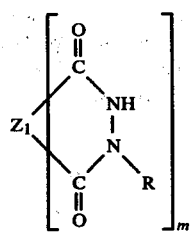

wherein:
R is selected from the group consisting of hydrogen, alkyl, aryl and such groups having hydroxyl, carboxylic acid ester, oxyether and carbonyl groups having from one to about thirty carbon atoms;

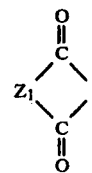

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

5. A light stabilizer composition comprising
(1) at least one hindered heterocyclic amine having the formula:

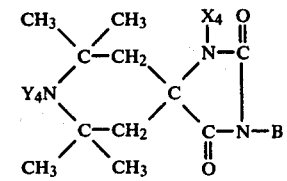

in which
$Y_4$ is hydrogen or methyl;
$X_4$ is hydrogen or methyl; and
B is selected from the group consisting of alkyl, epoxy alkyl, alkenyl and cycloalkyl having from one to about eighteen carbon atoms, and

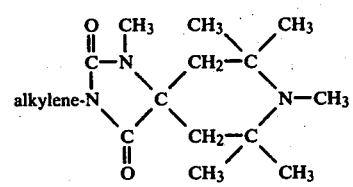

in which the alkylene has from one to about ten carbon atoms; together with
(2) at least one heterocyclic acid hydrazide having the formula:

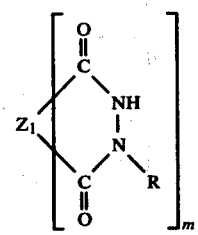

wherein:
R is selected from the group consisting of hydrogen, alkyl, aryl and such groups having hydroxyl, carboxylic acid ester, oxyether and carbonyl groups having from one to about thirty carbon atoms;

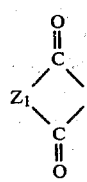

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

6. A light stabilizer composition comprising (1) at least one hindered heterocyclic amine having the formula:

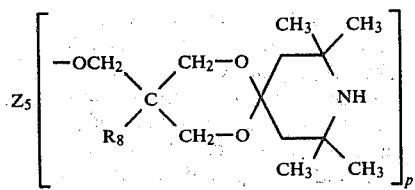

in which $R_8$ is hydrogen or alkyl having from one to about six carbon atoms;

p is an even number from 2 to 6; and $Z_5$ is the residue of a carboxylic acid having from one to about thirty carbon atoms or an inorganic oxyacid of phosphorus, silicon, or boron; together with (2) at least one heterocyclic acid hydrazide having the formula:

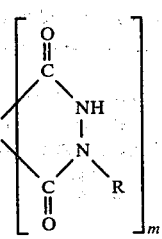

wherein:

R is selected from the group consisting of hydrogen, alkyl, aryl and such groups having hydroxyl, carboxylic acid ester, oxyether and carbonyl groups having from one to about thirty carbon atoms;

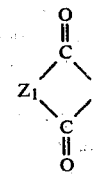

is the residue of a dicarboxylic or tetracarboxylic acid, wherein $Z_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

7. A light stabilizer composition according to claim 1 in which X is alkylene having from two to four carbon atoms.

8. A light stabilizer composition according to claim 1 in which X is alkylene having from two to four carbon atoms substituted with a carboxylic acid ester group.

9. A light stabilizer composition according to claim 1 in which X is alkylene substituted with a carboxylic acid ester group and a phenolic group.

10. A light stabilizer composition according to claim 1 in which X is alkylene substituted with an amide group.

11. A light stabilizer composition according to claim 1 in which X is alkylene substituted with a phenolic group.

12. A light stabilizer composition comprising (1) at least one hindered heterocyclic amine having the formula:

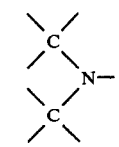

wherein A is alkylene completing the ring structure;

X is a bivalent linking radical including at least one up to four ring carbon atoms completing the ring structure as a heterocyclic ring having from five to seven ring atoms of which at least one is nitrogen and from three to six are carbon;

$R_1$ and $R_2$ are each selected from the group consisting of lower alkyl, and $R_1$ and $R_2$ taken together as pentylene $(CH_2)_5$;

R$_3$ and R$_4$ are each selected from the group consisting of lower alkyl and R$_3$ and R$_4$ taken together as one of butylene—(CH$_2$)$_4$, pentylene—(CH$_2$)$_5$, and —CH$_2$—C(CH$_3$)$_2$—NH—C(CH$_3$)$_2$—CH$_2$—;

n is 1 or 2; and

Y$_1$ is selected from the group consisting of hydrogen, O•, OH, alkyl, alkenyl, alkynyl, aralkyl and acyl having from one to about thirty carbon atoms; and when n is 1, Y$_2$ is selected from the group consisting of bivalent alkylene, alkenylene, alkynylene, cycloalkylene and arylkylene having from one to about thirty carbon atoms;

and when n is 2, Y$_2$ is selected from the group consisting of trivalent alkylene, alkenylene, alkynylene, cycloalkylene and aralkylene having from one to about thirty carbon atoms;

together with (2) at least one heterocyclic acid hydrazide having the formula:

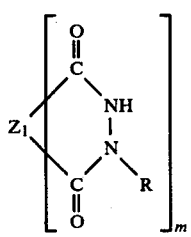

wherein:

R is selected from the group consisting of hydrogen, alkyl, aryl and such groups having hydroxyl, carboxylic acid ester, oxyether and carbonyl groups having from one to about thirty carbon atoms;

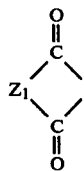

is the residue of a dicarboxylic or tetracarboxylic acid, wherein Z$_1$ is selected from the group consisting of alkylene, alkenylene, cycloalkylene, alkylcycloalkylene, arylene and alkylarylene having from one to about thirty carbon atoms, and such radicals bearing free carboxylic acid or carboxylic acid ester groups; and m is 1 or 2, the heterocyclic acid hydrazide being in an amount synergizing the stabilizing effectiveness of the hindered heterocyclic amine.

13. A light stabilizer composition according to claim 1 in which X is alkylene substituted with a phosphite ester group.

14. A light stabilizer composition according to claim 1 in which Z$_1$ is alkylene.

15. A light stabilizer composition according to claim 1 in which Z$_1$ is aralkylene.

16. A light stabilizer composition according to claim 1 in which Z$_1$ is arylene.

17. A light stabilizer composition according to claim 1 in which Z$_1$ is cycloalkylene.

18. A light stabilizer composition according to claim 1 in which Z$_1$ includes a second

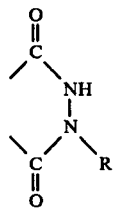

group.

19. A light stabilizer composition according to claim 1 in which R is hydrogen.

20. A polyvinyl chloride resin composition having improved resistance to deterioration when heated at 350° F., comprising a polyvinyl chloride resin and a compound in accordance with claim 1.

21. A polyvinyl chloride resin composition in accordance with claim 20, in which the polyvinyl chloride resin is polyvinyl chloride homopolymer.

22. A polyvinyl chloride resin composition in accordance with claim 20, in which the polyvinyl chloride resin is a copolymer of vinyl chloride and vinyl acetate.

23. An olefin polymer composition having improved resistance to deterioration comprising an olefin polymer selected from the group consisting of polymers of alpha-olefins having from two to six carbon atoms and polystyrene, and a compound in accordance with claim 1.

24. An olefin polymer composition in accordance with claim 23 wherein the polyolefin is polypropylene.

25. An olefin polymer composition in accordance with claim 23 wherein the polyolefin is polyethylene.

26. An acrylonitrile-butadiene-styrene polymer having its resistance to deterioration when heated at 300° F. and above enhanced by a compound in accordance with claim 1.

27. A polyester polymer composition having improved resistance to deterioration comprising a polyester polymer and a compound in accordance with claim 1.

28. A polyurethane resin composition having improved resistance to deterioration comprising a polyurethane resin and a compound in accordance with claim 1.

29. An ethylene-vinyl acetate copolymer composition having improved resistance to deterioration comprising an ethylene-vinyl acetate copolymer and a compound in accordance with claim 1.

* * * * *